(12) United States Patent
Wang et al.

(10) Patent No.: US 12,184,215 B1
(45) Date of Patent: Dec. 31, 2024

(54) FAULT TOLERANT MOTOR DRIVER

(71) Applicant: Amazon Technologies, Inc., Seattle, WA (US)

(72) Inventors: Xiaoqi Wang, Bellevue, WA (US); Andrew Lueneburg, Seattle, WA (US); Frederic Pierre Lacaux, Kirkland, WA (US); Sheverria Antony Aikens, Mill Creek, WA (US)

(73) Assignee: Amazon Technologies, Inc., Seattle, WA (US)

( * ) Notice: Subject to any disclaimer, the term of this patent is extended or adjusted under 35 U.S.C. 154(b) by 77 days.

(21) Appl. No.: 17/821,313

(22) Filed: Aug. 22, 2022

(51) Int. Cl.
*H02P 29/028* (2016.01)
*H02K 11/33* (2016.01)

(52) U.S. Cl.
CPC ............ *H02P 29/028* (2013.01); *H02K 11/33* (2016.01)

(58) Field of Classification Search
CPC ................................ H02P 29/028; H02K 11/33
USPC ........................ 318/139, 400.26, 400.01, 700
See application file for complete search history.

(56) References Cited

U.S. PATENT DOCUMENTS

| | | | |
|---|---|---|---|
| 10,608,575 B2 * | 3/2020 | Kawazu | H02P 29/0241 |
| 11,128,251 B1 * | 9/2021 | Solodovnik | H02P 25/22 |
| 11,271,515 B2 * | 3/2022 | Kimura | H02M 1/325 |
| 2010/0140415 A1 | 6/2010 | Goossen | |
| 2012/0182024 A1 | 7/2012 | Ike et al. | |
| 2014/0300180 A1 | 10/2014 | Iwashita et al. | |
| 2016/0236790 A1 | 8/2016 | Knapp et al. | |
| 2017/0246959 A1 | 8/2017 | Loftus et al. | |
| 2019/0334468 A1 | 10/2019 | Stauffer et al. | |

* cited by examiner

*Primary Examiner* — David Luo
(74) *Attorney, Agent, or Firm* — Athorus, PLLC

(57) ABSTRACT

Described are systems and methods for providing fault tolerant drivers for electric motors. Embodiments of the present disclosure may provide a single power electronics unit and/or ESC that is configured to drive more than one electric motor. According to exemplary embodiments, each power electronics unit and/or ESC may be connected to more than one electric motor (e.g., three electric motors, etc.) and each power electronics unit and/or ESC may be configured to drive and/or control a single phase of multiple electric motors. This can facilitate two-phase mode operation in the event of a faulty power electronics unit and/or ESC, thereby facilitating continued operation of the affected electric motors. Exemplary embodiments of the present disclosure can also provide alternate modes of operation for the electric motors that are operating in two-phase mode to mitigate thermal stresses that may be experienced by the power electronics and/or the electric motors during two-phase operation.

20 Claims, 12 Drawing Sheets ically, electric motors are driven and/or controlled by power electronics, which may be configured to supply power to the electric motors from a power supply to achieve the desired operation and/or performance of the electric motors. In certain applications, the power electronics driving and/or controlling an electric motor may be referred to as an electronic speed controller (ESC) and can facilitate operation of the electric motors at the desired speed, torque, and the like. Traditionally, a single electric motor may be driven and/or controlled by a dedicated power electronics unit (e.g., ESC). However, a fault or failure condition experienced by a dedicated power electronics unit (e.g., the ESC) employed in traditional systems and/or devices can result in a complete motor out condition.

DETAILED DESCRIPTION

Figure 1:
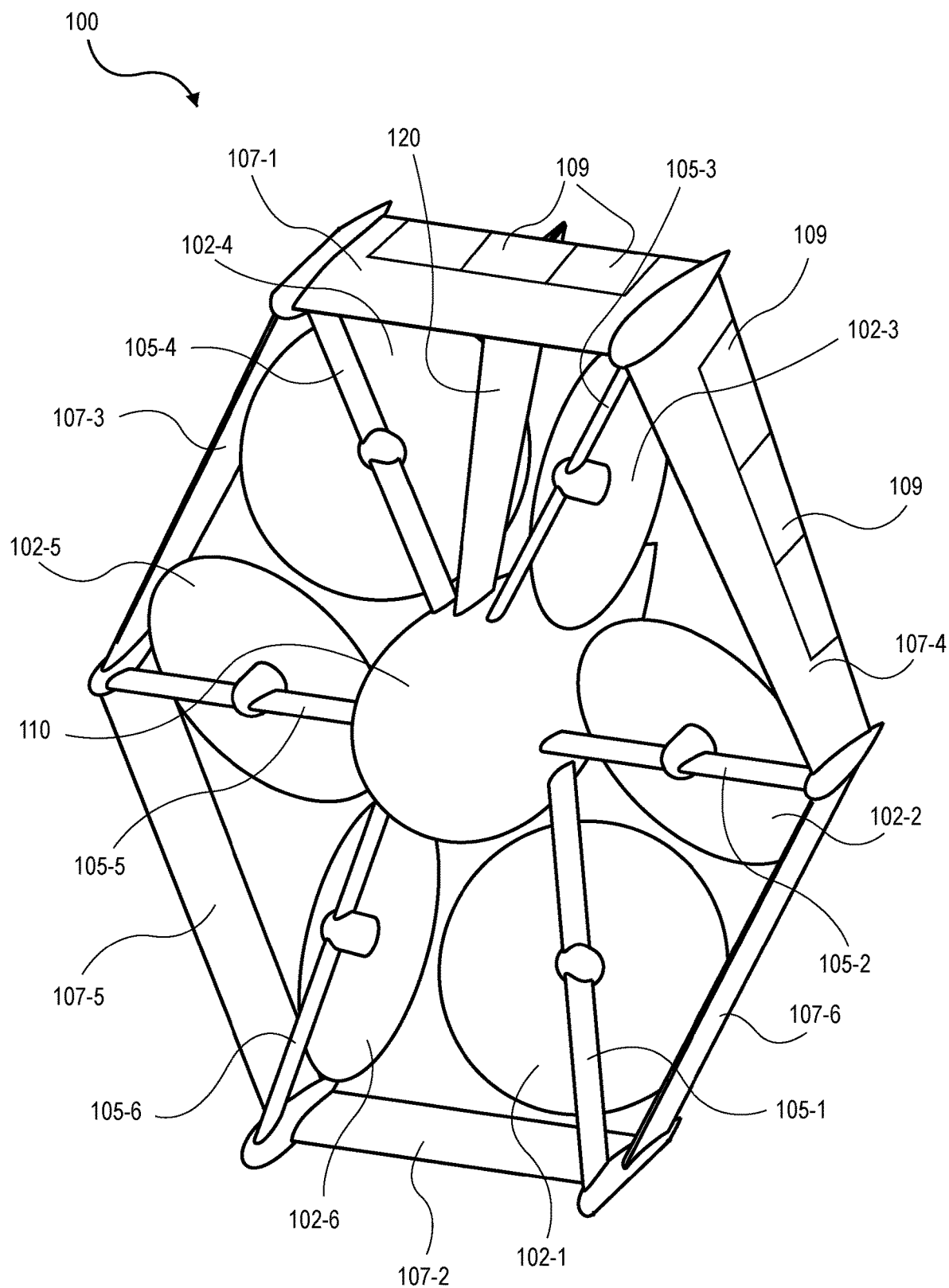
FIG. 1 illustrates an exemplary unmanned aerial vehicle, according to exemplary embodiments of the present disclosure.

As is set forth in greater detail below, exemplary embodiments of the present disclosure are generally directed to systems and methods for providing fault tolerant drivers for electric motors. Unlike traditional devices and systems that may employ a dedicated power electronics/motor drive unit (e.g., inverter, electronic speed controller (ESC), etc.) for each corresponding electric motor, according to exemplary embodiments of the present disclosure, a single power electronics/motor drive unit may be configured to drive more than one electric motor. In an exemplary implementation, a single power electronics/motor drive unit may be connected to more than one electric motor (e.g., three electric motors, etc.) and each power electronics/motor drive unit may be configured to drive and/or control a single phase of multiple electric motors. Accordingly, a fault and/or failure experienced by a single power electronics/motor drive unit would not result in a complete motor out condition. Rather, the motors driven and/or controlled by the faulty power electronics/motor drive unit may continue to operate in two-phase mode, thereby facilitating continued operation of the affected electric motors. Exemplary embodiments of the present disclosure can also provide alternate modes of operation for the electric motors that are operating in two-phase mode to mitigate thermal stresses that may be experienced by the power electronics and/or the electric motors during two-phase operation.

According to an exemplary implementation of the present disclosure, the exemplary fault tolerant motor drivers may be employed in an aerial vehicle, such as an unmanned aerial vehicle (UAV) utilizing six electric motors in connection with its propulsion mechanisms. Accordingly, three power electronics/motor drive units may be connected to three of the six electric motors so that each of the three power electronics/motor drive units can drive and/or control a single phase of the three electric motors, and three additional power electronics/motor drive units may be connected to the remaining three of the six electric motors so that each of the additional three power electronics/motor drive units can drive and/or control a single phase of the remaining three electric motors. For example, a first power electronics/motor drive unit may be connected to and configured to drive and/or control a first phase of the first three electric motors; a second power electronics/motor drive unit may be connected to and configured to drive and/or control a second phase of the first three electric motors, a third power electronics/motor drive unit may be connected to and configured to drive and/or control a third phase of the first three electric motors, a fourth power electronics/motor drive unit may be connected to and configured to drive and/or control a first phase of the remaining three electric motors, a fifth power electronics/motor drive unit may be connected to and configured to drive and/or control a second phase of the remaining three electric motors, and a sixth power electronics/motor drive unit may be connected to and configured to drive and/or control a third phase of the remaining three electric motors. Aspects of the present disclosure contemplate any combination and/or permutation of arrangements associating the various power electronics/motor drive unit to the various phases of the various electric motors.

According to exemplary embodiments of the present disclosure, each power electronics/motor drive unit may include a three-phase inverter having three pairs of switches (e.g., MOSFETs, insulated-gate bipolar transistors (IGBTs), etc.) and two protection devices and/or circuit breakers (e.g., solid state circuit breakers, switches, fuses, etc.) —one on the positive rail of the shared direct current (DC) bus coupling the power electronics/motor drive unit and one on the negative rail of shared DC bus coupling the power electronics/motor drive unit. In an implementation where six power electronics/motor drive units are driving and controlling six electric motors, the first inverter legs of the three-phase inverters of the first three power electronics/motor drive units may be connected to and configured to drive and/or control the first phase of the first three electric motors, the second inverter legs of the three-phase inverters of the first three power electronics/motor drive units may be connected to and configured to drive and/or control the second phase of the first three electric motors, the third inverter legs of the three-phase inverters of the first three power electronics/motor drive units may be connected to and configured to drive and/or control the third phase of the first three electric motors, the first inverter legs of the three-phase inverters of the remaining three power electronics/motor drive units may be connected to and configured to drive and/or control the first phase of the remaining three electric motors, the second inverter legs of the three-phase inverters of the remaining three power electronics/motor drive units may be connected to and configured to drive and/or control the second phase of the remaining three electric motors, and the third inverter legs of the three-phase inverters of the remaining three power electronics/motor drive units may be connected to and configured to drive and/or control the third phase of the remaining three electric motors.

In the exemplary implementation, in the event that any of the first, second, or third power electronics/motor drive units were to experience a fault or failure condition, the protection devices and/or circuit breakers associated with the power electronics/motor drive unit experiencing the fault or failure can be tripped to isolate the faulty power electronics/motor drive unit, and the first three electric motors may continue to operate in two-phase mode, without the need for additional protection devices and/or circuit breakers disposed on each inverter leg of the power electronics/motor drive units. Similarly, if any of the fourth, fifth, or sixth power electronics/motor drive units were to experience a fault or failure condition, the protection devices and/or circuit breakers associated with the power electronics/motor drive unit experiencing the fault or failure can isolate the faulty power electronics/motor drive unit, and the remaining three motors may operate in two-phase mode. While operating in two-phase mode, exemplary embodiments of the present disclosure can also provide load balancing techniques so as to mitigate thermal stresses that may be experienced by the power electronics/motor drive units and/or the electric motors during two-phase operation. For example, the arrangement of the power electronics/motor drive units to electric motor connections may be configured in a particular manner to facilitate load balancing operation of the electric motors to compensate for the electric motors operating in two-phase mode. Alternatively and/or in addition, one or more operating states may be determined (e.g., in view of the power electronics/motor drive units to electric motors connection arrangement), and the electric motors may be cycled through the one or more operating states, so as to mitigate thermal stresses that may be experienced by the power electronics/motor drive units and/or the electric motors during two-phase operation.

According to exemplary embodiments of the present disclosure, the power electronics/motor drive units may be implemented as sets of inverters. For example, according to exemplary implementations of the present disclosure, the power electronics for the various electric motors may be disposed and arranged in close physical proximity. Arranging the power electronics in close physical proximity can obviate the need for certain cabling and/or connectors, thereby significantly reducing the impedance between the inverters and power rails. Accordingly, the power electronics/motor drive units can be implemented as sets of any number of inverters (e.g., rather than discrete three-phase inverters) that effectively share a capacitor bank. Further, the sets of inverters can be isolated using a pair of protection devices and/or circuit breakers. The sets of inverters can be used in any combinations and/or permutations to drive and/or control any number of phases of any number of electric motors.

Advantageously, exemplary embodiments of the present disclosure may be implemented in an aerial vehicle so that the likelihood of motor out conditions may be reduced in situations where the power electronics associated with an electric motor of a propulsion mechanism may experience a fault and/or a failure. Further, reducing the likelihood of complete motor out conditions can facilitate down-sizing of certain components (e.g., power supply, electric motor, and the like) by mitigating the risks and operating parameters required for motor out conditions. This can facilitate increased efficiencies, decreased weight and/or complexities, increased range, and the like in the aerial vehicle. Further, although the exemplary embodiments of the present disclosure are primarily described with respect to electronic speed controllers (ESCs) implemented in an aerial vehicle, exemplary embodiments of the present disclosure may be applicable to other implementations employing alternative suitable power electronics/motor drive units (e.g., inverters, electronic torque converters, etc.) configured to drive alternating current (AC) motors in various applications.

FIG. 1 illustrates an exemplary unmanned aerial vehicle 100, according to exemplary embodiments of the present disclosure.

As shown in FIG. 1, aerial vehicle 100 may include a ring wing that is substantially hexagonal in shape and that surrounds a plurality of propulsion mechanisms. Aerial vehicle 100 may include six propulsion mechanisms 102-1, 102-2, 102-3, 102-4, 102-5, and 102-6 spaced about fuselage 110 of aerial vehicle 100. Although aerial vehicle 100 is shown with six propulsion mechanisms 102, aerial vehicle 100 may include any number of propulsion mechanisms 102. Propulsion mechanisms 102 may include electric motors, propellers, or any other form of propulsion and may each be controlled by respective power electronic/motor drive units, such as inverters, electronic speed controllers (ESCs), electronic torque controllers, and the like. In an exemplary implementation of the present disclosure, aerial vehicle 100 may include six ESCs, and each ESC may control a single phase of three of the propulsion mechanisms 102-1, 102-2, 102-3, 102-4, 102-5, and 102-6. For example, a first ESC may control a first phase of propulsion mechanisms 102-1, 102-3, and 102-5, a second ESC may control a second phase of propulsion mechanisms 102-1, 102-3, and 102-5, a third ESC may control a third phase of propulsion mechanisms 102-1, 102-3, and 102-5, a fourth ESC may control a first phase of propulsion mechanisms 102-2, 102-4, and 102-6, a fifth ESC may control a second phase of propulsion mechanisms 102-2, 102-4, and 102-6, and a sixth ESC may control a third phase of propulsion mechanisms 102-2, 102-4, and 102-6. Alternatively, aerial vehicle 100 may employ any suitable power electronics/motor drive units (e.g., inverters, electronic torque converters, etc.) to drive propulsion mechanisms 102-1, 102-2, 102-3, 102-4, 102-5, and 102-6. Further, one or more of propulsion mechanisms 102 of aerial vehicle 100 may utilize fans, jets, turbojets, turbo fans, jet engines, and/or the like to maneuver the aerial vehicle. Generally described, propulsion mechanism 102, as used herein, can include any form of propulsion mechanism that is capable of generating a force sufficient to maneuver aerial vehicle 100, alone and/or in combination with other propulsion mechanisms. Furthermore, in certain implementations, propulsion mechanisms 102 may be configured such that their individual orientations may be dynamically modified.

Likewise, while the examples herein describe the propulsion mechanisms being able to generate force in either direction, in some implementations, the propulsion mechanisms may only generate force in a single direction, however, the orientation of the propulsion mechanism may be adjusted so that the force can be oriented in a positive direction, a negative direction, and/or any other direction.

In the illustrated implementation, aerial vehicle 100 can also include ring wing 107 having a substantially hexagonal shape that extends around and forms the perimeter of aerial vehicle 100. In the illustrated example, ring wing 107 can include six segments 107-1, 107-2, 107-3, 107-4, 107-5, and 107-6 that are joined at adjacent ends to form ring wing 107 around aerial vehicle 100. Each segment of ring wing 107 has an airfoil shape to produce lift when aerial vehicle 100 is oriented and moving in a direction that is substantially horizontal. As illustrated, and discussed further below, the ring wing is positioned at a canted angle with respect to fuselage 110, such that lower segment 107-2 of ring wing 107 acts as a front wing as it is toward the front of the aerial vehicle when oriented as shown and moving in a horizontal direction. Upper segment 107-1 of ring wing 107, which has a longer chord length than lower segment 107-2 of ring wing 107, is positioned, in a horizontal orientation, further back relative to lower segment 107-2, and thus can act as a rear wing.

Ring wing 107 can be secured to fuselage 110 by motor arms 105. In this example, motor arms 105-1, 105-2, 105-3, 105-4, 105-5, and 105-6 are coupled to fuselage 110 at one end and are coupled to ring wing 107 at a second end, thereby securing ring wing 107 to fuselage 110. In other implementations, less than all of motor arms 105 may extend from fuselage 110 and couple to ring wing 107.

In some implementations, aerial vehicle 100 may also include one or more stabilizer fins 120 that extend from fuselage 110 to ring wing 107. Stabilizer fin 120 may also have an airfoil shape. In the illustrated example, stabilizer fin 120 extends vertically from fuselage 110 to ring wing 107. In other implementations, stabilizer fin 120 may be disposed at other positions. For example, stabilizer fin 120 may extend downward from the fuselage between motor arm 105-1 and motor arm 105-6.

As illustrated, propulsion mechanisms 102 may be oriented at different angles with respect to each other. For example, propulsion mechanisms 102-2 and 102-5 can be aligned with fuselage 110 such that the force generated by each of propulsion mechanisms 102-2 and 102-5 is in-line or in the same direction or orientation as the fuselage. In the illustrated example, aerial vehicle 100 is oriented for high-speed, fixed-wing, wing-borne, horizontal flight such that the fuselage is oriented horizontally in the direction of travel. In such an orientation, propulsion mechanisms 102-2 and 102-5 provide horizontal forces, also referred to herein as thrusting forces and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of fuselage 110. Accordingly, when aerial vehicle 100 is oriented for horizontal flight, propulsion mechanisms 102-1, 102-3, 102-4, and 102-6 may be used to provide thrust in a non-horizontal direction to cause the aerial vehicle to pitch, yaw, roll, heave and/or sway. In other implementations, during horizontal flight, propulsion mechanisms 102-1, 102-3, 102-4, and 102-6 may be disabled such that they do not produce any forces and aerial vehicle 100 may be propelled aerially in a horizontal direction as a result of the lifting force from the aerodynamic shape of the ring wing 107 and the horizontal thrust produced by propulsion mechanisms 102-2 and 102-5.

The angle of orientation of each of the propulsion mechanisms 102-1, 102-2, 102-3, 102-4, 102-5, and 102-6 may vary for different implementations. Likewise, in some implementations, the offset of the propulsion mechanisms 102-1, 102-2, 102-3, 102-4, 102-5, and 102-6 may each be the same, with some oriented in one direction and some oriented in another direction, may each be oriented different amounts, and/or in different directions. Further, the configuration and arrangement of propulsion mechanisms 102-1, 102-2, 102-3, 102-4, 102-5, and 102-6 may also facilitate load balancing operation of aerial vehicle 100 in the event that one or more of propulsion mechanisms 102-1, 102-2, 102-3, 102-4, 102-5, and 102-6 may be operating in two-phase mode in view of a failure or fault condition associated with the power electronics/motor drive unit associated with propulsion mechanisms 102-1, 102-2, 102-3, 102-4, 102-5, and 102-6.

In the illustrated example of FIG. 1, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of propulsion mechanisms 102-1, 102-2, 102-3, 102-4, 102-5, and 102-6 is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about third motor arm 105-2 and oriented toward propulsion mechanism 102-3. Finally, propulsion mechanism 102-4 is oriented approximately thirty degrees in the first direction about fourth motor arm 105-4 and toward propulsion mechanism 102-5. As illustrated, propulsion mechanisms 102-3 and 102-6, which are on opposing sides of fuselage 110, are aligned and oriented in a same first direction (in this example, horizontal). Propulsion mechanisms 102-2 and 102-5, which are on opposing sides of fuselage 110, are aligned and oriented in a same second direction, which is angled compared to the first direction. Propulsion mechanisms 102-1 and 102-4, which are on opposing sides of fuselage 110, are aligned and oriented in a same third direction, which is angled compared to the first direction and the second direction.

Figure 2A:
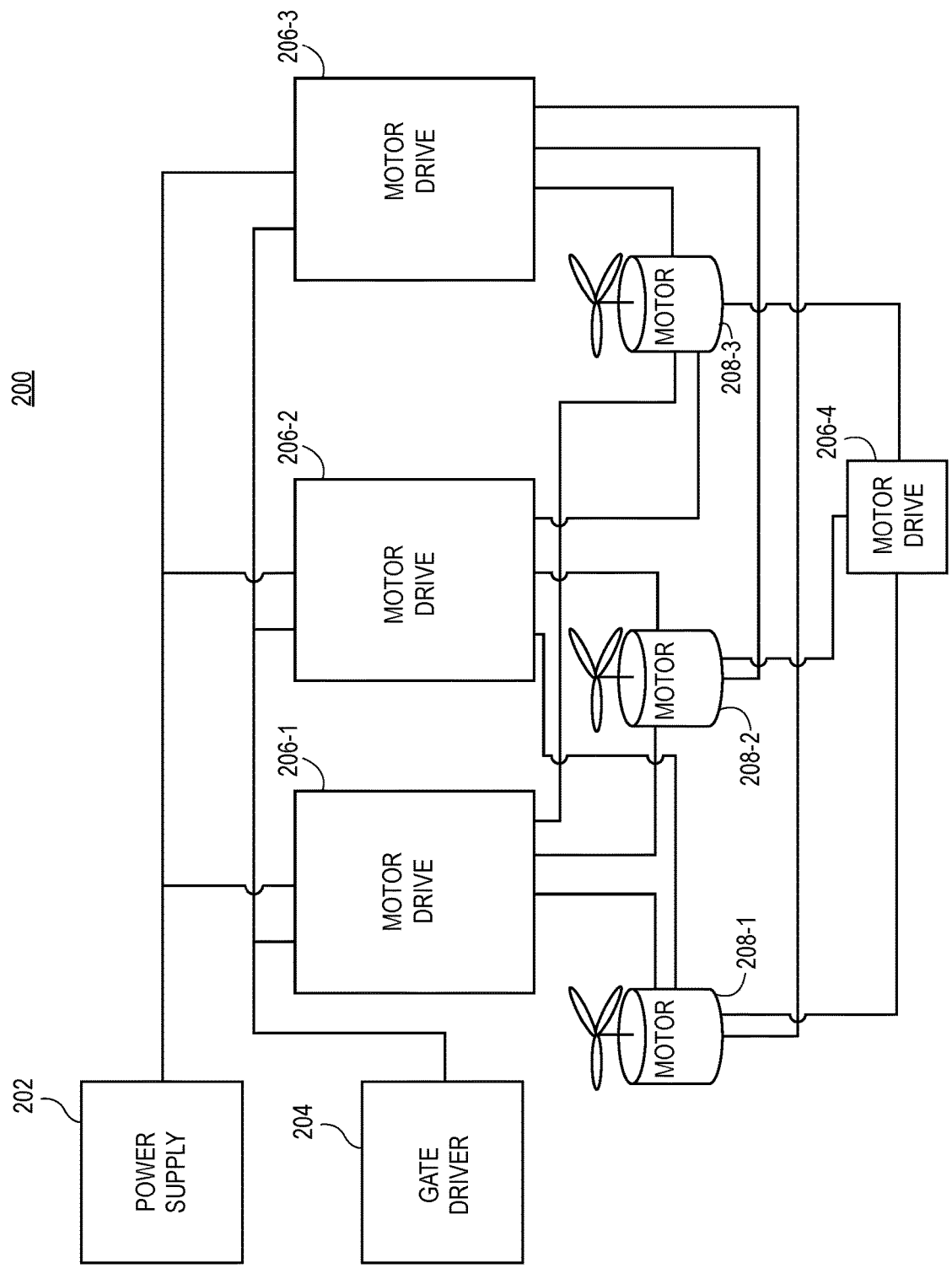
FIG. 2A is a block diagram illustrating a simplified exemplary power electronics system, according to exemplary embodiments of the present disclosure.

FIG. 2A is a block diagram illustrating a simplified exemplary power electronics system 200, according to exemplary embodiments of the present disclosure. Although FIG. 2A illustrates an exemplary power electronics system having three motor drive units driving and/or controlling three electric motors, other exemplary implementations may include any number of power electronics/motor drive units driving and/or controlling any number of electric motors.

As shown in FIG. 2A, exemplary power electronics system 200 may be connected to and configured to drive and/or control the operation of electric motors 208-1, 208-2, and 208-3. As illustrated, power electronics system 200 can include power supply 202, gate driver(s) 204, and power electronics/motor drive units 206-1, 206-2, and 206-3. According to exemplary embodiments of the present disclosure, electric motors 208-1, 208-2, and 208-3 may include three-phase electric motors, and each power electronics/motor drive unit 206-1, 206-2, and 206-3 may include any suitable AC motor drive unit, such as an ESC, electronic torque controller, and the like. In an exemplary implementation, each power electronics/motor drive unit 206-1, 206-

2, and 206-3 may include a three-phase inverter configured to drive and/or control motors 208-1, 208-2, and 208-3. According to certain aspects of the present disclosure, each three-phase inverter of power electronics/motor drive units 206-1, 206-2, 206-3 may include three pairs of switches (e.g., each pair of switches corresponding to each phase of the three-phase inverter) that may be controlled by gate driver 204. For example, gate driver 204 can provide triggering signals to the switches of power electronics/motor drive units 206-1, 206-2, and 206-3 so that power electronics/motor drive units 206-1, 206-2, and 206-3 can provide pulses to electric motors 208-1, 208-2, and 208-3 to achieve the desired operation (e.g., speed, torque, etc.) of electric motors 208-1, 208-2, and 208-3. Optionally, exemplary power electronics system 200 may include power electronics/motor drive unit 206-4, which may be electrically coupled to the neutral terminal of electric motors 208, so as to improve current ripple and/or torque performance associated with the operation of electric motors 208.

Further, each power electronics/motor drive unit 206-1, 206-2, and 206-3 may include one or more protection devices and/or circuit breakers (e.g., solid state circuit breakers, fuses, switches, etc.) configured to isolate each respective power electronics/motor drive unit in the event of a fault or failure condition.

In the exemplary implementation shown in FIG. 2A, each power electronics/motor drive unit 206-1, 206-2, and 206-3 may be electrically coupled to power supply 202 (e.g., via a shared direct current (DC) bus) and electric motors 208-1, 208-2, and 208-3. As illustrated, each power electronics/motor drive unit 206-1, 206-2, and 206-3 may be configured to drive and/or control a single phase of all three electric motors 208-1, 208-2, and 208-3. For example, power electronics/motor drive unit 206-1 may be configured to drive and/or control a first phase of electric motors 208-1, 208-2, and 208-3, power electronics/motor drive unit 206-2 may be configured to drive and/or control a second phase of electric motors 208-1, 208-2, and 208-3, and power electronics/motor drive unit 206-3 may be configured to drive and/or control a third phase of electric motors 208-1, 208-2, and 208-3. Further, in the event of a fault and/or failure condition by any of power electronics/motor drive units 206-1, 206-2, and/or 206-3, the isolation devices of the power electronics/motor drive unit experiencing the fault and/or failure condition may isolate the power electronics/motor drive unit from power supply 202. For example, in the exemplary implementation where each power electronics/motor drive unit 206 drives and/or controls a single phase of electric motors 208-1, 208-2, and 208-3, in the event that any one power electronics/motor drive unit 206 experiences a fault and/or failure condition, the isolation devices of the power electronics/motor drive unit experiencing the fault and/or failure condition may trip so as to isolate the faulty power electronics/motor drive unit from power supply 202. Accordingly, this would cause the phase of electric motors 208-1, 208-2, and 208-3 driven by the isolated faulty power electronics/motor drive unit to no longer be driven, and each of electric motors 208-1, 208-2, and 208-3 would operate in two-phase mode (e.g., driven by the two power electronics/motor drive units that are not experiencing a fault and/or failure condition), without the need for additional protection devices and/or circuit breakers disposed on each inverter leg of power electronics/motor drive units 206.

Figure 2B:
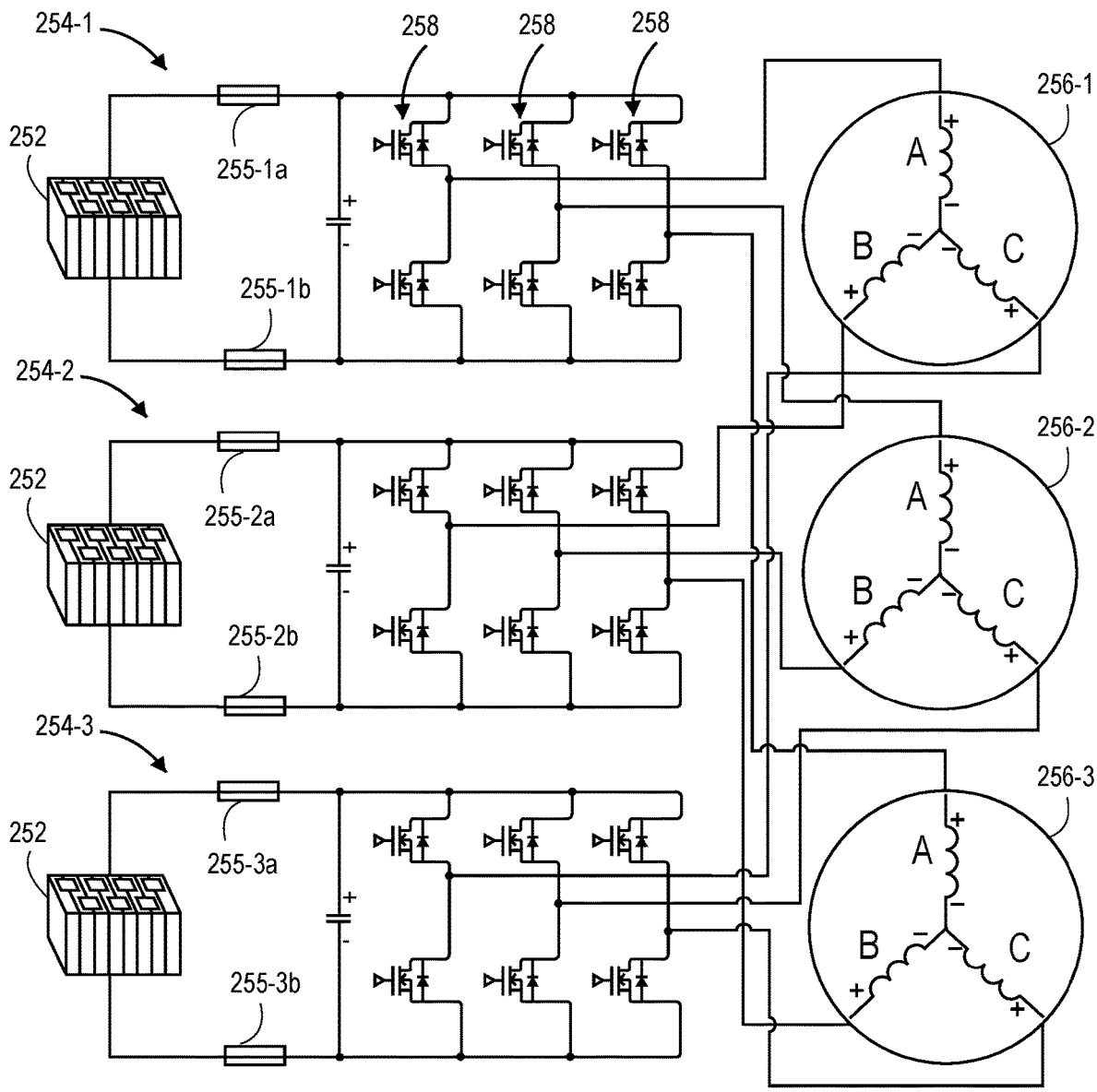
FIG. 2B is a schematic illustration of an exemplary power electronics system, according to exemplary embodiments of the present disclosure.

FIG. 2B is a schematic illustration of an exemplary power electronics system 250, according to exemplary embodiments of the present disclosure. The schematic illustration of power electronics system 250 may represent a more detailed view of power electronics system 200, shown in FIG. 2B. Further, although FIG. 2B illustrates an exemplary power electronics system having three power electronics/motor drive units driving and/or controlling three electric motors, other exemplary implementations may include any number of electronic speed controllers driving and/or controlling any number of electric motors.

As shown in FIG. 2B, exemplary power electronics system 250 may include power electronics/motor drive units 254-1, 254-2, and 254-3, which may be connected to power supplies 252 and configured to drive and/or control the operation of electric motors 256-1, 256-2, and 256-3. Although power supplies 252 are illustrated in FIG. 2B as three separate power supplies, according to exemplary embodiments of the present disclosure, power supplies 252 may include a single power supply or any number of power supplies.

As illustrated, each power electronics/motor drive unit 254 may include a respective three-phase inverter, which may include three pairs of switches 258, for a total of six switches. Each pair of switches may form a single inverter leg of the three-phase inverter of each respective power electronics/motor drive unit 254. Further, the switches may be controlled by a gate driver (not shown), which can provide triggering signals to control the operation of switches 258 so that power electronics/motor drive units 254 provide pulses to electric motors 256 to achieve the desired operation (e.g., speed, torque, etc.) of electric motors 256.

In the implementation illustrated in FIG. 2B, each power electronics/motor drive unit 254 may be connected to and configured to drive and/or control a single phase of each electric motor 256. As shown in FIG. 2B, a first inverter leg of the three-phase inverter of power electronics/motor drive unit 254-1 may be connected to and configured to drive and/or control phase A of electric motor 256-1, a second inverter leg of the three-phase inverter of power electronics/motor drive unit 254-1 may be connected to and configured to drive and/or control phase A of electric motor 256-2, and a third inverter leg of the three-phase inverter of power electronics/motor drive unit 254-1 may be connected to and configured to drive and/or control phase A of electric motor 256-3. Similarly, a first inverter leg of the three-phase inverter of power electronics/motor drive unit 254-2 may be connected to and configured to drive and/or control phase B of electric motor 256-1, a second inverter leg of the three-phase inverter of power electronics/motor drive unit 254-2 may be connected to and configured to drive and/or control phase B of electric motor 256-2, and a third inverter leg of the three-phase inverter of power electronics/motor drive unit 254-2 may be connected to and configured to drive and/or control phase B of electric motor 256-3; and a first inverter leg of the three-phase inverter of power electronics/motor drive unit 254-3 may be connected to and configured to drive and/or control phase C of electric motor 256-1, a second inverter leg of the three-phase inverter of power electronics/motor drive unit 254-3 may be connected to and configured to drive and/or control phase C of electric motor 256-2, and a third inverter leg of the three-phase inverter of power electronics/motor drive unit 254-3 may be connected to and configured to drive and/or control phase C of electric motor 256-3. Although FIG. 2B illustrates an exemplary implementation where power electronics/motor drive units 254 each drive a single phase of motors 256, exemplary embodiments of the present disclosure contemplate any combination and/or permutation of power electronics/motor drive units connected to and/or configured to drive and/or control a phase of multiple electric motors. For example, a first power electronics/motor drive unit may be configured to drive a single phase of motor 1, motor 2, and motor 3, a second power electronics/motor drive unit may be configured to drive a single phase of motor 2, motor 3, and motor 4, a third power electronics/motor drive unit may be configured to drive a single phase of motor 3, motor 4, and motor 5, and the like. Accordingly, any combination and/or permutation of power electronics/motor drive units to phases of motors may be accomplished using exemplary implementations of the present disclosure.

Returning to FIG. 2B, if any one of power electronics/motor drive unit 254 were to experience a fault and/or failure condition that would render the affected power electronics/motor drive unit inoperable, all three electric motors 256 would be able to continue to operate in two-phase mode, without the need for additional protection devices and/or circuit breakers disposed on each inverter leg of power electronics/motor drive units 254. For example, if power electronics/motor drive unit 254-1 were to experience a fault and/or failure condition which rendered power electronics/motor drive unit 254-1 inoperable, phases B and C of electric motors 256 would continue to be driven and/or controlled, thereby facilitating continued operation of electric motors 256 in two-phase mode. Similarly, power electronics/motor drive unit 254-2 were to experience a fault and/or failure condition which rendered power electronics/motor drive unit 254-2 inoperable, phases A and C of electric motors 256 would continue to be driven and/or controlled, thereby facilitating continued operation of electric motors 256 in two-phase mode, and if power electronics/motor drive unit 254-3 were to experience a fault and/or failure condition which rendered power electronics/motor drive unit 254-3 inoperable, phases A and B of electric motors 256 would continue to be driven and/or controlled, thereby facilitating continued operation of electric motors 256 in two-phase mode.

As also shown in FIG. 2B, power electronics/motor drive units 254 may be electrically coupled to power supplies 252 via protection devices and/or circuit breakers 255-1*a*, 255-1*b*, 255-2*a*, 255-2*b*, 255-3*a*, and 255-3*b*. Protection devices and/or circuit breakers 255-1*a*, 255-2*a*, and 255-3*a* may include bi-directional circuit breakers that couple the positive rail of power supplies 252 to each respective power electronics/motor drive unit 254, and protection devices and/or circuit breakers 255-1*b*, 255-2*b*, and 255-3*b* may couple each respective power electronics/motor drive unit 254 to the negative rail of power supplies 252. Alternatively and/or in addition, protection devices and/or circuit breakers 255 can include any suitable protection device (e.g., switches, fuses, etc.) that can isolate electronics/motor drive units 254. Accordingly, in the event of a fault and/or failure condition (e.g., a DC open condition, a DC short condition, a line open condition, a switch open condition, a switch short condition, and the like) experienced by any power electronics/motor drive unit 254, the corresponding protection devices and/or circuit breakers 255 may be tripped so as to isolate the power electronics/motor drive unit experiencing the fault and/or failure condition. For example, in the event that power electronics/motor drive unit 254-1 is experiencing a fault and/or failure condition, protection devices and/or circuit breakers 255-1*a* and 255-1*b* may be tripped to isolate power electronics/motor drive unit 254-1. Similarly, if power electronics/motor drive unit 254-2 were experiencing a fault and/or failure condition, protection devices and/or circuit breakers 255-2*a* and 255-2*b* may be tripped so as to isolate power electronics/motor drive unit 254-2, and/or if power electronics/motor drive unit 254-3 were experiencing a fault and/or failure condition, protection devices and/or circuit breakers 255-3*a* and 255-3*b* may be tripped to isolate power electronics/motor drive unit 254-3.

Optionally, exemplary power electronics system 250 may include a fourth power electronics/motor drive unit (not shown), which may be electrically coupled to the neutral terminal of electric motors 256. The fourth power electronics/motor drive unit may, for example, improve current ripple and/or torque performance associated with the operation of electric motors 256.

Figure 2C:
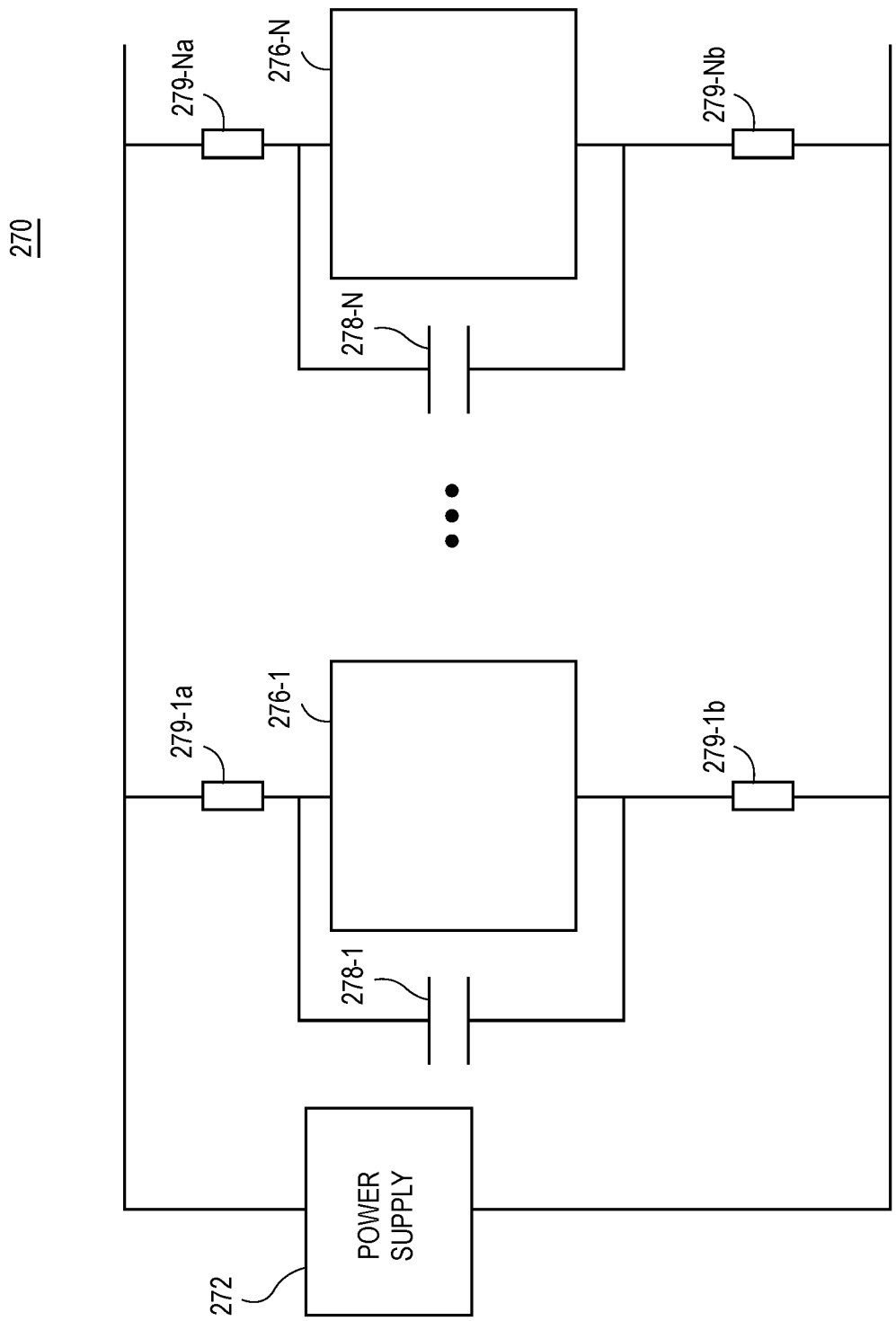
FIG. 2C is a block diagram of an exemplary power electronics system, according to exemplary embodiments of the present disclosure.

FIG. 2C is a block diagram of an exemplary power electronics system 270, according to exemplary embodiments of the present disclosure.

As shown in FIG. 2C, exemplary power electronics system 270 include power supply 272 and power electronics/motor drive units implemented as sets of inverters 276-1 through 276-N, which may be configured to drive and/or control a phase of one or more electric motors (not shown). Each set of inverters 276 may further be associated with corresponding protection devices and/or circuit breakers (e.g., solid state circuit breakers) 279-1*a*, 279-1*b*, 279-N*a*, and 279-N*b*, which may be configured to be tripped and isolate the corresponding set of inverters in the event of a fault and/or failure condition associated with the corresponding set of inverters. Specifically, protection devices 279-1*a* and 279-1*b* may be tripped to isolate set of inverter 276-1, and protection devices 279-N*a* and 279-N*b* may be tripped to isolate set of inverter 276-N. Further, each set of inverters may effectively include respective DC capacitors 278-1 through 278-N, which may also be isolated by their respective protection devices 279.

According to exemplary embodiments of the present disclosure, power electronics system 270 may function in a manner substantially similar to power electronics system 250, however, rather than an power electronics/motor drive unit that includes a three-phase inverter, each set of inverters 276 may include any number of phases, and each phase of sets of inverters 276 may be configured to drive and/or control a single phase of an electric motor. For example, 276-1 may include a three-phase inverter, 276-N may include a six-phase inverter, etc. However, exemplary embodiments of the present disclosure contemplate any number of sets of inverters 276 having any number of phases. Further, each set of inverters 276 may be isolated in the event of a fault and/or failure condition via tripping of corresponding protection devices and/or circuit breakers (e.g., solid state circuit breakers) 279-1*a*, 279-1*b*, 279-N*a*, and 279-N*b*.

Grouping inverters into inverter sets 276 provides further flexibility in configuring and arranging the drive and/or control of each phase of a plurality of electric motors. For example, power electronics system 270 can facilitate any combination and/or permutation of isolatable inverters connected to and/or configured to drive one or more single phases of electric motors may be accomplished.

Figure 3A:
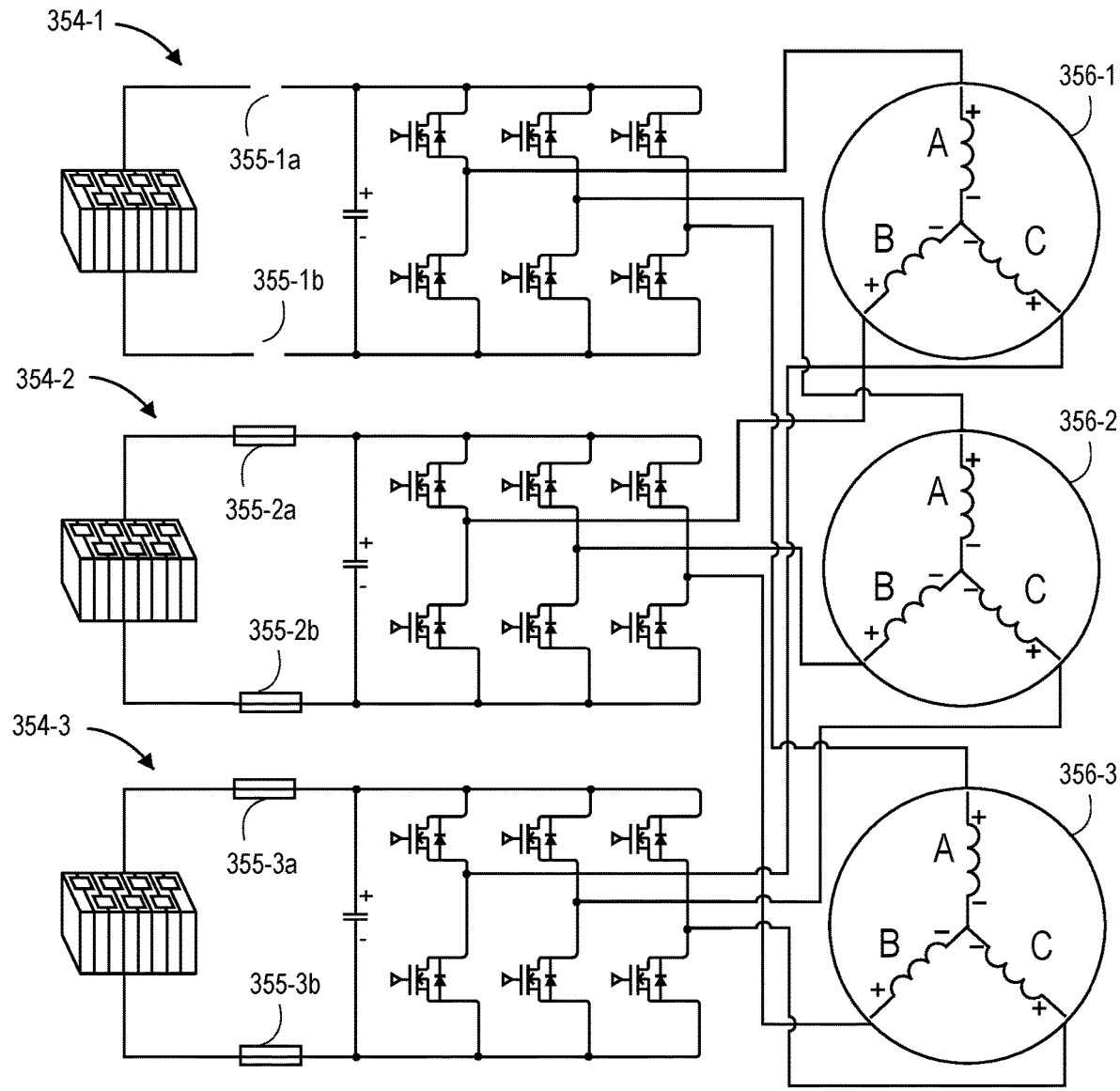
FIGS. 3A-3C are schematic illustrations of an exemplary power electronics system, according to exemplary embodiments of the present disclosure.
Figure 3B:
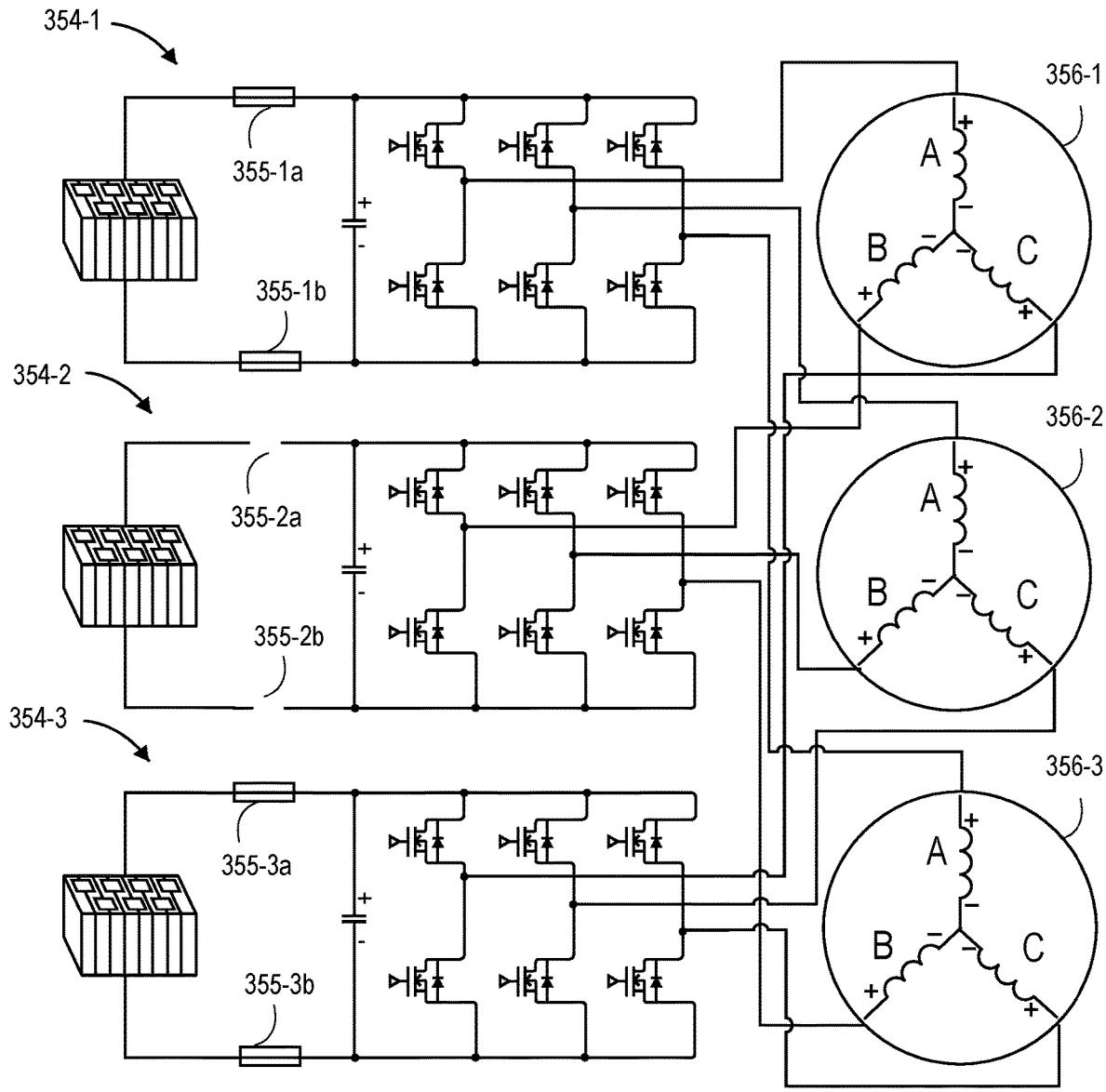
Figure 3C:
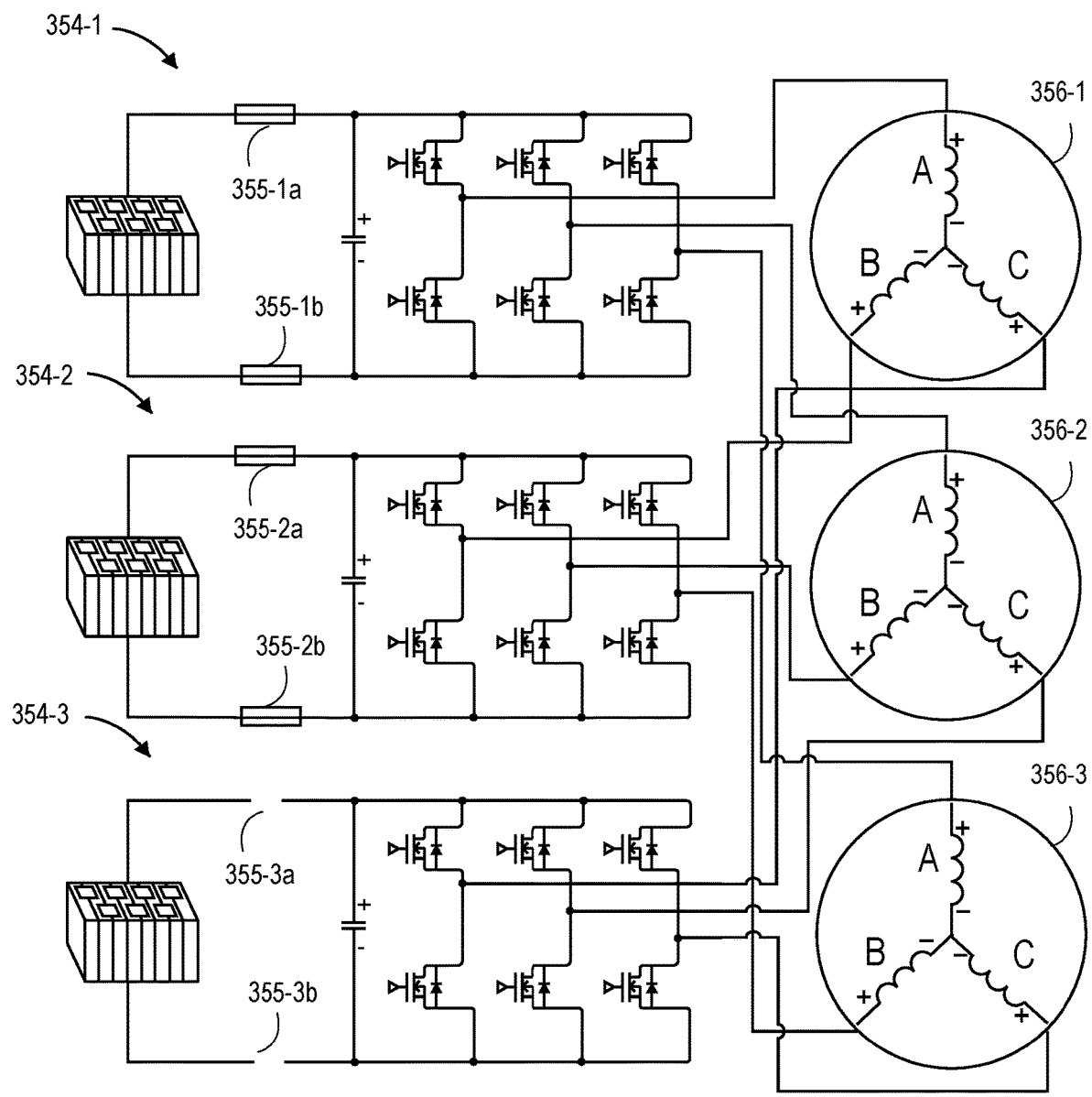

FIGS. 3A-3C are schematic illustrations of exemplary power electronics system 350, according to exemplary embodiments of the present disclosure.

As shown in FIGS. 3A-3C, exemplary power electronics system 350 may be substantially similar to power electronics system 250 shown in FIG. 2B, however, FIGS. 3A-3C may illustrate certain fault and/or failure conditions associated with power electronics system 350. Accordingly, under normal operation where none of power electronics/motor drive units 354 are experiencing a fault and/or failure condition, power electronics/motor drive unit 354-1 may be electrically coupled to and/or configured to drive and/or control phase A of electric motors 356-1, 356-2, and 356-3. Similarly, power electronics/motor drive unit 354-2 may be electrically coupled to and/or configured to drive and/or control phase B of electric motors 356-1, 356-2, and 356-3, and power electronics/motor drive unit 354-3 may be electrically coupled to and/or configured to drive and/or control phase C of electric motors 356-1, 356-2, and 356-3.

FIG. 3A may illustrate an exemplary implementation where power electronics/motor drive unit 354-1 may be experiencing a fault and/or failure condition. For example, power electronics/motor drive unit 354-1 may be experiencing a fault and/or failure condition, such as, a DC open condition, a DC short condition, a line open condition, a switch open condition, a switch short condition, and the like. In view of the fault and/or failure condition being experienced by power electronics/motor drive unit 354-1, a remediation action may have been taken to isolate power electronics/motor drive unit 354-1. For example, as shown in FIG. 3A, protection devices and/or circuit breakers 355-1*a* and 355-1*b* may be tripped to isolate power electronics/motor drive unit 354-1. Upon isolation of power electronics/motor drive unit 354-1, phase A of electric motors 356 will no longer be driven. Accordingly, electric motors 356 may continue to operate in two-phase mode, where phase B and phase C of electric motors 356 may continue to be driven and/or controlled by power electronics/motor drive units 354-2 and 354-3, respectively. Further, exemplary embodiments of the present disclosure may facilitate different operating states and/or conditions in view of the two-phase mode operation of electric motors 356. For example, certain operational parameters and/or patterns may be applied in the operation of electric motors 356 to balance the load between electric motors 356 so as to mitigate the potential for thermal stresses that may be experienced by electric motors 356, as well as power electronics/motor drive units 354-2 and 354-3.

Similar to FIG. 3A, FIG. 3B may illustrate an exemplary implementation where power electronics/motor drive unit 354-2 may be experiencing a fault and/or failure condition. For example, power electronics/motor drive unit 354-2 may be experiencing a fault and/or failure condition, such as, a DC open condition, a DC short condition, a line open condition, a switch open condition, a switch short condition, and the like. In view of the fault and/or failure condition being experienced by power electronics/motor drive unit 354-2, a remediation action may have been taken to isolate power electronics/motor drive unit 354-2. For example, as shown in FIG. 3B, protection devices and/or circuit breakers 355-2*a* and 355-2*b* may be tripped to isolate power electronics/motor drive unit 354-2. Upon isolation of power electronics/motor drive unit 354-2, phase B of electric motors 356 will no longer be driven. Accordingly, electric motors 356 may continue to operate in two-phase mode, where phase A and phase C of electric motors 356 may continue to be driven and/or controlled by power electronics/motor drive units 354-1 and 354-3, respectively. Further, exemplary embodiments of the present disclosure may facilitate different operating states and/or conditions in view of the two-phase mode operation of electric motors 356. For example, certain operational parameters and/or patterns may be applied in the operation of electric motors 356 to balance the load between electric motors 356 so as to mitigate the potential for thermal stresses that may be experienced by electric motors 356, as well as power electronics/motor drive units 354-1 and 354-3.

Similar to FIGS. 3A and 3B, FIG. 3C may illustrate an exemplary implementation where power electronics/motor drive unit 354-3 may be experiencing a fault and/or failure condition. For example, power electronics/motor drive unit 354-3 may be experiencing a fault and/or failure condition, such as, a DC open condition, a DC short condition, a line open condition, a switch open condition, a switch short condition, and the like. In view of the fault and/or failure condition being experienced by power electronics/motor drive unit 354-3, a remediation action may have been taken to isolate power electronics/motor drive unit 354-3. For example, as shown in FIG. 3C, protection devices and/or circuit breakers 355-3*a* and 355-3*b* may be tripped to isolate power electronics/motor drive unit 354-3. Upon isolation of power electronics/motor drive unit 354-3, phase C of electric motors 356 will no longer be driven. Accordingly, electric motors 356 may continue to operate in two-phase mode, where phase A and phase B of electric motors 356 may continue to be driven and/or controlled by power electronics/motor drive units 354-1 and 354-2, respectively. Further, exemplary embodiments of the present disclosure may facilitate different operating states and/or conditions in view of the two-phase mode operation of electric motors 356. For example, certain operational parameters and/or patterns may be applied in the operation of electric motors 356 to balance the load between electric motors 356 so as to mitigate the potential for thermal stresses that may be experienced by electric motors 356, as well as power electronics/motor drive units 354-1 and 354-2.

Figure 4:
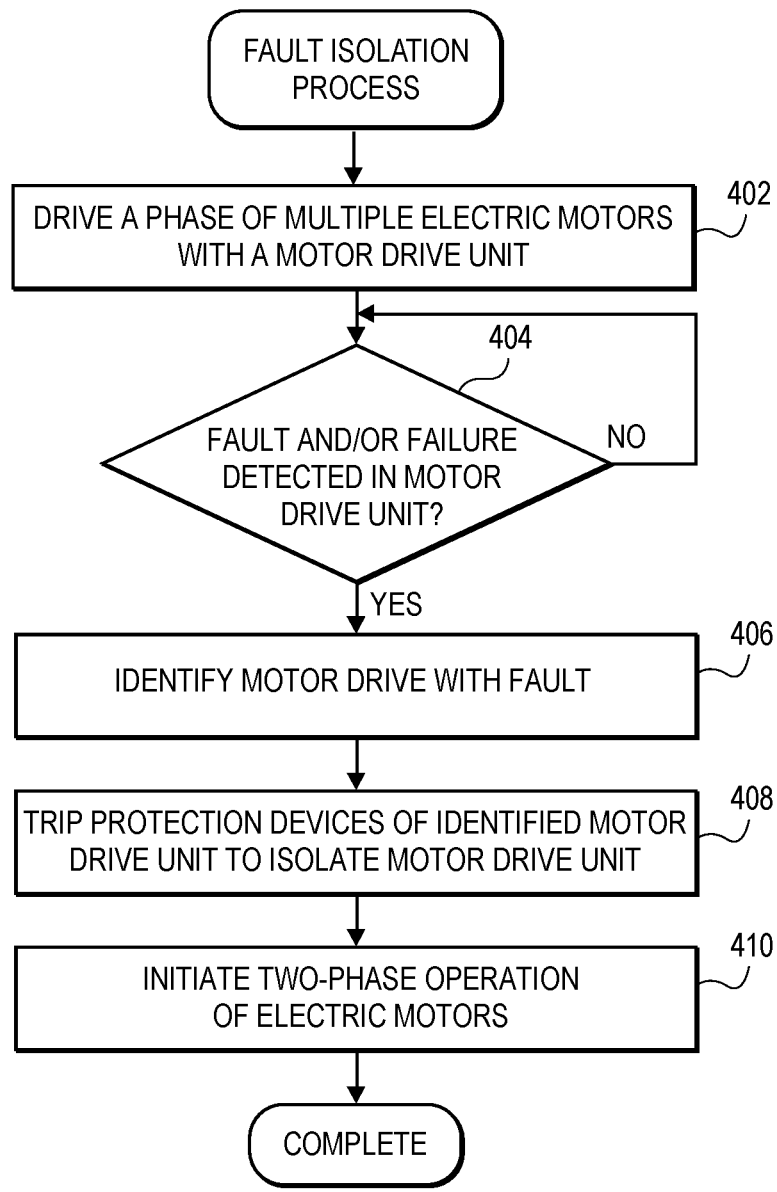
FIG. 4 is a flow diagram of an exemplary fault isolation process, according to exemplary embodiments of the present disclosure.

FIG. 4 is a flow diagram of an exemplary fault isolation process 400, according to exemplary embodiments of the present disclosure.

As shown in FIG. 4, exemplary fault isolation process 400 may begin with driving a single phase of multiple electric motors using a single power electronics/motor drive unit, such as an electronic speed controller (ESC) (e.g., power electronics/motor drive unit 206 and 254, etc.), as in step 402. For example, a power electronics/motor drive unit may include a three-phase inverter, and each leg of the three-phase inverter may be connected to and configured to drive and/or control a single phase of each of three electric motors. In an exemplary implementation of the present disclosure, fault isolation process 400 may be performed during aerial flight of an aerial vehicle (e.g., aerial vehicle 100) having six propulsion mechanisms. Accordingly, in such an implementation, six power electronics/motor drive units may be configured to drive and/or control the electric motors associated with the six propulsion mechanisms, where the first three power electronics/motor drive units may each control a single phase of the first three electric motors associated with the first three propulsion mechanisms, and the remaining three power electronics/motor drive units may each control a single phase of the remaining three electric motors associated with the remaining three propulsion mechanisms.

In step 404, it may be determined whether a fault and/or failure condition is detected in any of the power electronics/motor drive units. In the event no fault or failure condition is detected, ordinary operation may continue. Continuing the exemplary implementation of performing fault isolation process 400 during aerial flight of an aerial vehicle having six propulsion mechanisms, ordinary operation may include, for example, the six power electronics/motor drive units driving and controlling the six electric motors associated with the six propulsion mechanisms, such that each electric motor is operating in three-phase mode.

If a fault and/or failure condition is detected, in step 406, the power electronics/motor drive unit experiencing the fault and/or failure condition may be identified. In step 408, protection devices of the identified power electronics/motor drive unit may be tripped so as to isolate the power electronics/motor drive unit experiencing the fault and/or failure condition. For example, protection devices and/or circuit breakers (e.g., protection devices and/or circuit breakers 255) may be tripped so that the power electronics/motor drive unit experiencing the fault and/or failure condition is isolated. Continuing the exemplary implementation of performing fault isolation process 400 during aerial flight of an aerial vehicle having six propulsion mechanisms where each power electronics/motor drive unit drives and/or controls a single phase of three electric motors associated with three propulsion mechanisms, in the event that one of the six power electronics/motor drive units experiences a fault and/or failure condition and is isolated from the power source, the remaining five power electronics/motor drive units will continue to drive and/or control the six electric motors associated with the six propulsion mechanisms. Three of the power electronics/motor drive units will continue to drive and control three electric motors associated with three of the six propulsion mechanisms so that the three electric motors continue to operate in three-phase mode, while two of the power electronics/motor drive units will drive and control two-phases of the remaining three electric motors associated with the remaining three propulsion mechanisms, such that the remaining three electric motors operate in two-phase mode.

In step 410, two-phase operation of the electric motors may be initiated. Continuing the exemplary implementation of performing fault isolation process 400 during aerial flight of an aerial vehicle having six propulsion mechanisms where each power electronics/motor drive unit drives and/or controls a single phase of three electric motors associated with three propulsion mechanisms, the three electric motors having a phase driven and/or controlled by the power electronics/motor drive unit which was isolated in view of the fault and/or failure condition may operate in two-phase mode. Two-phase operation may include, for example, various load balancing techniques. For example, the electric motors operating in two-phase motor may be configured to produce reduced thrust, and the reduced thrust of the electric motors operating in in two-phase mode can be compensated with the electric motors that continue to operate in three-phase mode. Alternatively and/or in addition, multiple operational patterns can be determined, and the various operational patterns can be alternated so as to mitigate thermal stresses that the electric motors and/or the power electronics/motor drive units may experience during operation in two-phase mode. Two-phase mode operation is discussed in further detail herein in connection with FIGS. 5 and 6.

Figure 5:
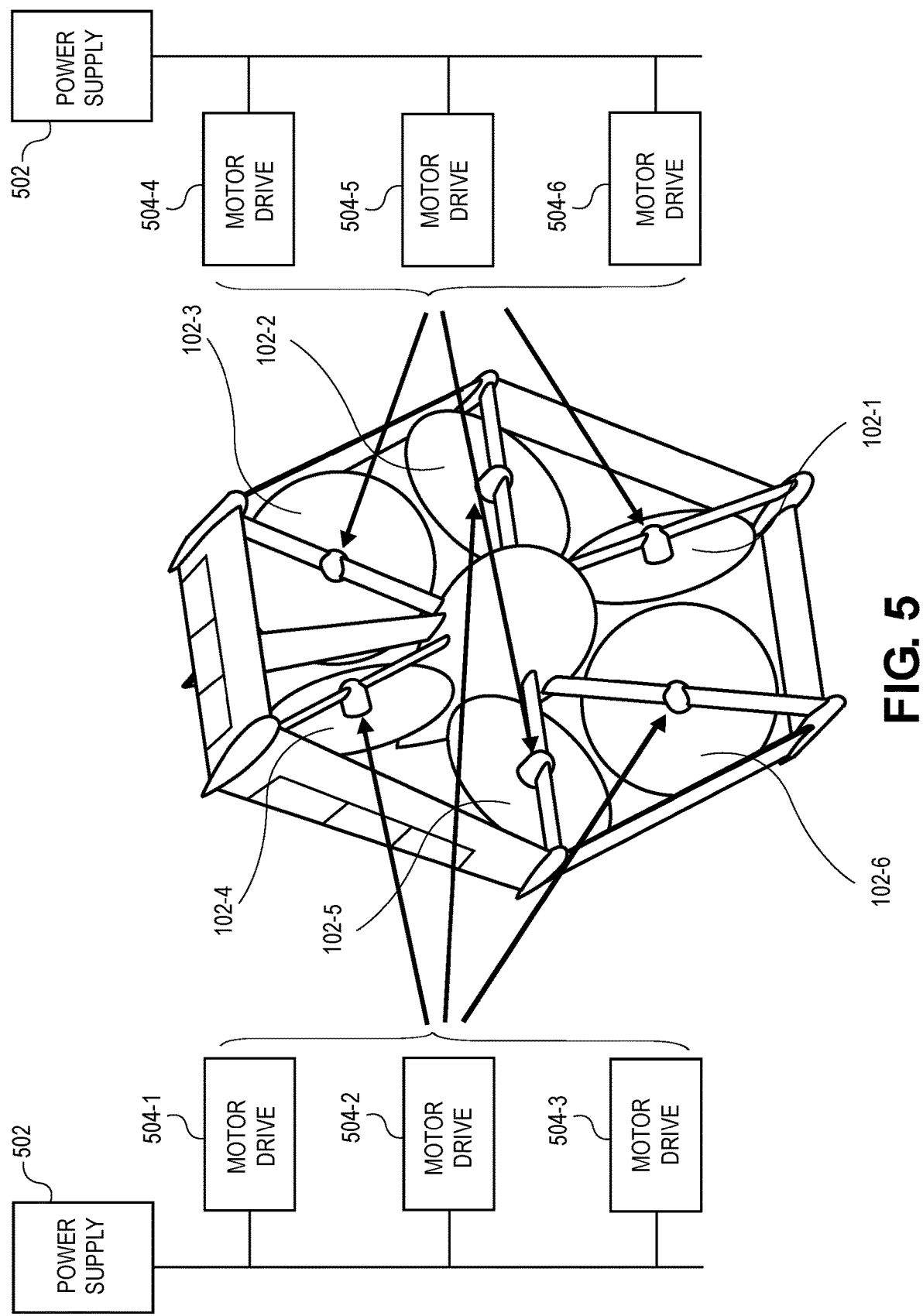
FIG. 5 is an illustration of an exemplary ESC configuration, according to exemplary embodiments of the present disclosure.

FIG. 5 is an illustration of an exemplary power electronics/motor drive unit configuration that can facilitate load balancing for two-phase mode operation of one or more propulsion mechanisms, according to exemplary embodiments of the present disclosure.

In the exemplary implementation illustrated in FIG. 5, an aerial vehicle may include six propulsion mechanisms 102-1, 102-2, 102-3, 102-4, 102-5, and 102-6 where each propulsion mechanism includes a respective electric motor that is driven and/or controlled by power electronics/motor drive units 504-1, 504-2, 504-3, 504-4, 504-5, and 504-6. According to exemplary embodiments of the present disclosure, each power electronics/motor drive unit 504 may drive and/or control a single phase of three electric motors associated with three of the propulsion mechanisms 102. For example, power electronics/motor drive unit 504-1 may drive a first phase of electric motors associated with propulsion mechanisms 102-2, 102-4, and 102-6, power electronics/motor drive unit 504-2 may drive a second phase of electric motors associated with propulsion mechanisms 102-2, 102-4, and 102-6, and power electronics/motor drive unit 504-3 may drive a third phase of electric motors associated with propulsion mechanisms 102-2, 102-4, and 102-6. Similarly, power electronics/motor drive unit 504-4 may drive a first phase of electric motors associated with propulsion mechanisms 102-1, 102-3, and 102-5, power electronics/motor drive unit 504-5 may drive a second phase of electric motors associated with propulsion mechanisms 102-1, 102-3, and 102-5, and power electronics/motor drive unit 504-6 may drive a third phase of electric motors associated with propulsion mechanisms 102-1, 102-3, and 102-5.

Accordingly, in the exemplary implementation illustrated in FIG. 5, in the event that any single power electronics/motor drive unit experiences a fault and/or failure condition requiring that the faulty power electronics/motor drive unit be isolated from power supply 502, three of propulsion mechanisms 102 (e.g., the three propulsion mechanisms having a single phase of each respective electric motors driven and/or controlled by the faulty power electronics/motor drive unit) may operate in two-phase mode, while the remaining three propulsion mechanisms may continue to normally operate in three-phase mode. For example, if any of power electronics/motor drive units 504-1, 504-2, or 504-3 were to experience a fault and/or failure condition necessitating the faulty power electronics/motor drive unit to be isolated from power supply 502, propulsion mechanisms 102-2, 102-4, and 102-6 may operate in two-phase mode, while propulsion mechanisms 102-1, 102-3, and 102-5 may continue to operate normally in three-phase mode. Similarly, if any of power electronics/motor drive units 504-4, 504-5, or 504-6 were to experience a fault and/or failure condition necessitating the faulty power electronics/motor drive unit to be isolated from power supply 502, propulsion mechanisms 102-1, 102-3, and 102-5 may operate in two-phase mode, while propulsion mechanisms 102-2, 102-4, and 102-6 may continue to operate normally in three-phase mode.

As illustrated in FIG. 5, power electronics/motor drive units 504 may be associated with propulsion mechanisms 102 in a staggered and/or alternating arrangement to facilitate load balancing during two-phase mode operation in the event of a faulty power electronics/motor drive unit 504. For example, power electronics/motor drive units 504-1, 504-2, and 504-3 may be associated with propulsion mechanisms 102-2, 102-4, and 102-6, while power electronics/motor drive units 504-4, 504-5, and 504-6 may be associated with propulsion mechanisms 102-1, 102-3, and 102-5. Accordingly, in the event that any one of power electronics/motor drive units 504 experiences a fault and/or failure condition so that the faulty power electronics/motor drive unit is isolated from power supply 504 so that three of propulsion mechanisms 102 are operating in two-phase mode, the staggered and/or alternating arrangement can facilitate trimming of the aerial vehicle (e.g., using control surface, variations in thrust generated by the propulsion mechanisms, etc.) in such a manner that allows the aerial vehicle to operate in a load balanced configuration where the propulsion mechanisms that are operating in two-phase mode to generate reduced thrust relative to the propulsion mechanisms that are operating in three-phase mode. For example, if any of power electronics/motor drive units 504-1, 504-2, and 504-3 experience a fault and/or failure condition requiring the faulty power electronics/motor drive unit to be isolated from power supply 502, the aerial vehicle may be trimmed to compensate for the reduced thrust generated by propulsion mechanisms 102-2, 102-4, and 102-6, which are operating in two-phase mode, relative to the thrust generated by propulsion mechanisms 102-1, 102-3, and 102-5, which are operating in three-phase mode. Similarly, if any of power electronics/motor drive units 504-4, 504-5, and 504-6 experience a fault and/or failure condition requiring the faulty power electronics/motor drive unit to be isolated from power supply 502, the aerial vehicle may be trimmed to compensate for the reduced thrust generated by propulsion mechanisms 102-1, 102-3, and 102-5, which are operating in two-phase mode, relative to the thrust generated by propulsion mechanisms 102-2, 102-4, and 102-6, which are operating in three-phase mode.

Alternatively and/or in addition to load balancing facilitated by trimming the aerial vehicle in view of the staggered arrangement of associations between power electronics/motor drive units and propulsion mechanisms, embodiments of the present disclosure can also provide techniques for applying two or more different operating configurations for facilitating load balancing while the aerial vehicle may be operating in two-phase mode. According to certain aspects of the present disclosure, the propulsion mechanisms operating in two-phase mode may require additional current (e.g., approximately 1.25, 1.5, 1.75, etc. times the current relative to compared operation in three-phase mode) relative to operation in three-phase mode to generate the same amount of thrust. The additional required current may present thermal stress conditions for power electronics/motor drive units 504 and/or propulsion mechanisms 102. Accordingly, the two or more different operating configurations may be applied so as to mitigate thermal stress conditions for power electronics/motor drive units 504 and/or propulsion mechanisms 102. For example, a first operating configuration may configure propulsion mechanisms 102-2 and 102-5 to be the primary thrust generators, while propulsion mechanisms 102-1, 102-3, 102-4, and 102-6 are configured to provide thrust to control other flight parameters, such as pitch, roll, yaw, etc., and a second operating configuration may configure propulsion mechanisms 102-1, 102-3, 102-4, and 102-6 to be the primary thrust generators, while propulsion mechanisms 102-2 and 102-5 are configured to provide thrust to control other flight parameters, such as pitch, roll, yaw, etc. Other combinations of propulsion mechanisms configured to be the primary thrust generators and/or to provide thrust to control other flight parameters may also be utilized. According to exemplary implementations of the present disclosure, the operation of the aerial vehicle may be alternated between the first and second operating configurations, so as to mitigate thermal stresses that the power electronics/motor drive units 504 and/or propulsion mechanisms 102 may experience during two-phase operation.

Figure 6:
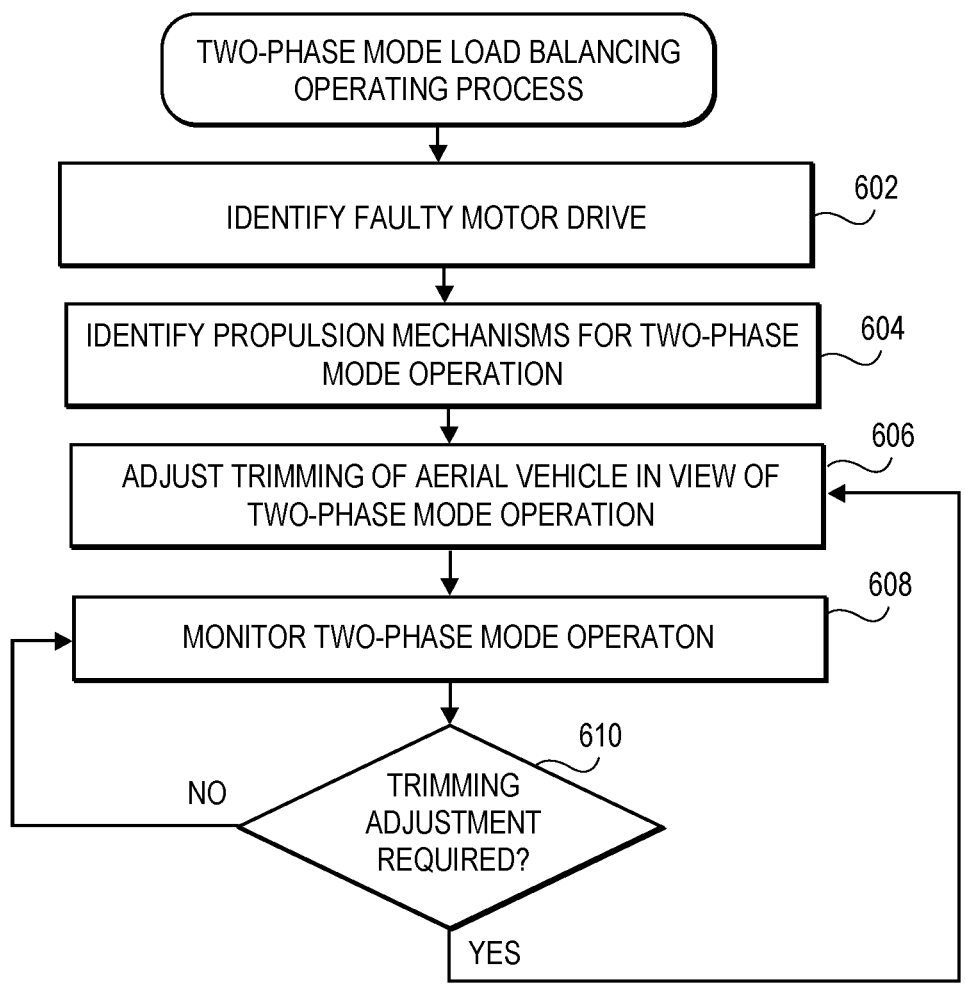
FIGS. 6 and 7 are flow diagrams illustrating exemplary two-phase mode load balancing operating processes, according to exemplary embodiments of the present disclosure.
Figure 7:
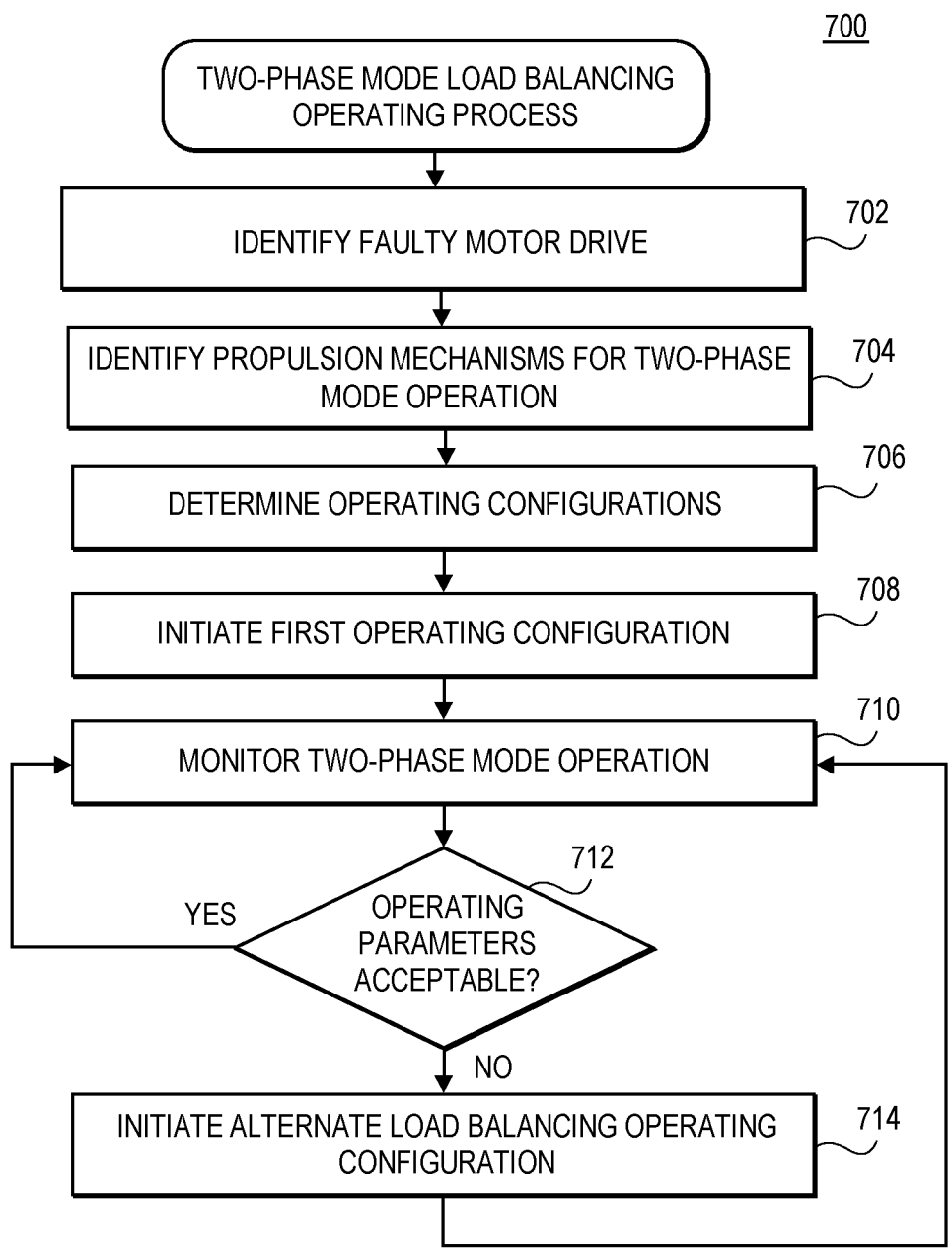

FIGS. 6 and 7 are flow diagrams illustrating exemplary two-phase mode load balancing operating processes 600 and 700, according to exemplary embodiments of the present disclosure. According to exemplary implementations, process 600 and/or process 700 may be performed by an aerial vehicle after detection and/or isolation of a faulty power electronics/motor drive unit.

As shown in FIG. 6, process 600 may begin with step 602, where a power electronics/motor drive unit experiencing a fault and/or failure condition may be identified. Optionally, step 602 may also include tripping of protection devices, which may isolate the faulty power electronics/motor drive unit from a power supply of the aerial vehicle. According to exemplary embodiments of the present disclosure each power electronics/motor drive unit of the aerial vehicle may drive and/or control a single phase of multiple electric motors associated with propulsion mechanisms of the aerial vehicle. Accordingly, upon isolating the faulty power electronics/motor drive unit, the electric motors driven and/or controlled by the faulty power electronics/motor drive unit may operate in two-phase mode. In step 604, the propulsion mechanisms of the aerial vehicle associated with the faulty power electronics/motor drive unit that may be operating in two-phase mode, may be identified.

In step 606, based on identification of the propulsion mechanisms of the aerial vehicle that will be operating in two-phase mode, trimming of the aerial vehicle may be adjusted (relative to trimming where all propulsion mechanisms are operating in three-phase mode). This may include, for example, considering the configuration and/or arrangement of the propulsion mechanisms operating in two-phase mode, as well as the arrangement and/or configuration of the propulsion mechanisms operating in three-phase mode. For example, the configuration, parameters, settings, etc. of various control surfaces and/or propulsion mechanisms may be adjusted to compensate for the reduced thrust generated by the propulsion mechanisms operating in two-phase mode.

In step 608, the two-phase mode operation of the aerial vehicle may be monitored, and it can be determined whether adjustments to trimming of the aerial vehicle may be required, as in step 610. For example, the operation of the propulsion mechanisms, and associated power electronics/motor drive units, operating in two-phase mode (e.g., thrust generated, thermal properties, etc.), as well as the operation of the aerial vehicle itself (e.g., pose of the aerial vehicle, altitude, deviations from the flight path, and the like) may be monitored to ensure that the aerial vehicle is achieving the expected performance during two-phase mode operation. If the performance of the aerial vehicle is acceptable, two-phase mode operation may continue and process 600 may return to step 608 to continue to monitor the two-phase mode operation. If the performance of the aerial vehicle is determined to be unacceptable, process 600 may return to step 606 to adjust the trimming of the aerial vehicle in view of the monitored parameters. Alternatively and/or in addition, the aerial vehicle may determine that it may be beneficial to perform an alternate and/or additional load balancing technique, such as applying different operating configurations, as described in further detail in connection with FIG. 7.

As shown in FIG. 7, process 700 may begin with step 702, where a power electronics/motor drive unit experiencing a fault and/or failure condition may be identified. Optionally, step 702 may also include tripping of protection devices, which may isolate the faulty power electronics/motor drive unit from a power supply of the aerial vehicle. According to exemplary embodiments of the present disclosure each power electronics/motor drive unit of the aerial vehicle may drive and/or control a single phase of multiple electric motors associated with propulsion mechanisms of the aerial vehicle. Accordingly, upon isolating the faulty power electronics/motor drive unit, the electric motors driven and/or controlled by the faulty power electronics/motor drive unit may operate in two-phase mode. In step 704, the propulsion mechanisms of the aerial vehicle associated with the faulty power electronics/motor drive unit that may be operating in two-phase mode, may be identified.

In step 706, based on identification of the propulsion mechanisms of the aerial vehicle that will be operating in two-phase mode, two or more different operating configurations for facilitating load balancing while the aerial vehicle may be operating in two-phase mode may be determined. According to certain aspects of the present disclosure, the propulsion mechanisms operating in two-phase mode may require additional current (e.g., approximately 1.25, 1.5, 1.75, etc. times the current relative to compared operation in three-phase mode) relative to operation in three-phase mode to generate the same amount of thrust. For example, a first operating configuration may configure certain propulsion mechanisms to be the primary thrust generators, while other propulsion mechanisms may be configured to provide thrust to control other flight parameters, such as pitch, roll, yaw, etc., and a second operating configuration may configure other propulsion mechanisms to be the primary thrust generators, while other propulsion mechanisms are configured to provide thrust to control other flight parameters, such as pitch, roll, yaw, etc. Any number of combinations of propulsion mechanisms configured to be the primary thrust generators and/or to provide thrust to control other flight parameters may also be utilized as different operating configurations.

In step 708, a first operating configuration of the determined operating conditions may be selected and initiated, and the two-phase mode operation of the aerial vehicle operating with the first operating configuration may be monitored, as in step 710. For example, a time that the aerial vehicle is operating with the operating configuration, the operation of the propulsion mechanisms, and associated power electronics/motor drive units operating in two-phase mode (e.g., thrust generated, thermal properties, etc.), as well as the operation of the aerial vehicle itself (e.g., pose of the aerial vehicle, altitude, deviations from the flight path, and the like) may be monitored to ensure that the aerial vehicle is achieving the expected performance during two-phase mode operation.

In step 712, it can be determined whether the monitored operation of the aerial vehicle is within acceptable parameters. This may include, for example, a predetermined period of time that each determined operating configuration is to be applied, thermal conditions associated with the propulsion mechanisms and/or the associated power electronics/motor drive units, and the like.

If the performance of the aerial vehicle is acceptable, two-phase mode operation may continue with the operating configuration, and process 700 may return to step 710 to continue to monitor the two-phase mode operation. If the performance of the aerial vehicle is outside of acceptable parameters, process 700 may proceed to step 714 to monitor the two-phase mode operation of the aerial vehicle with the alternate operating configuration.

Figure 8:
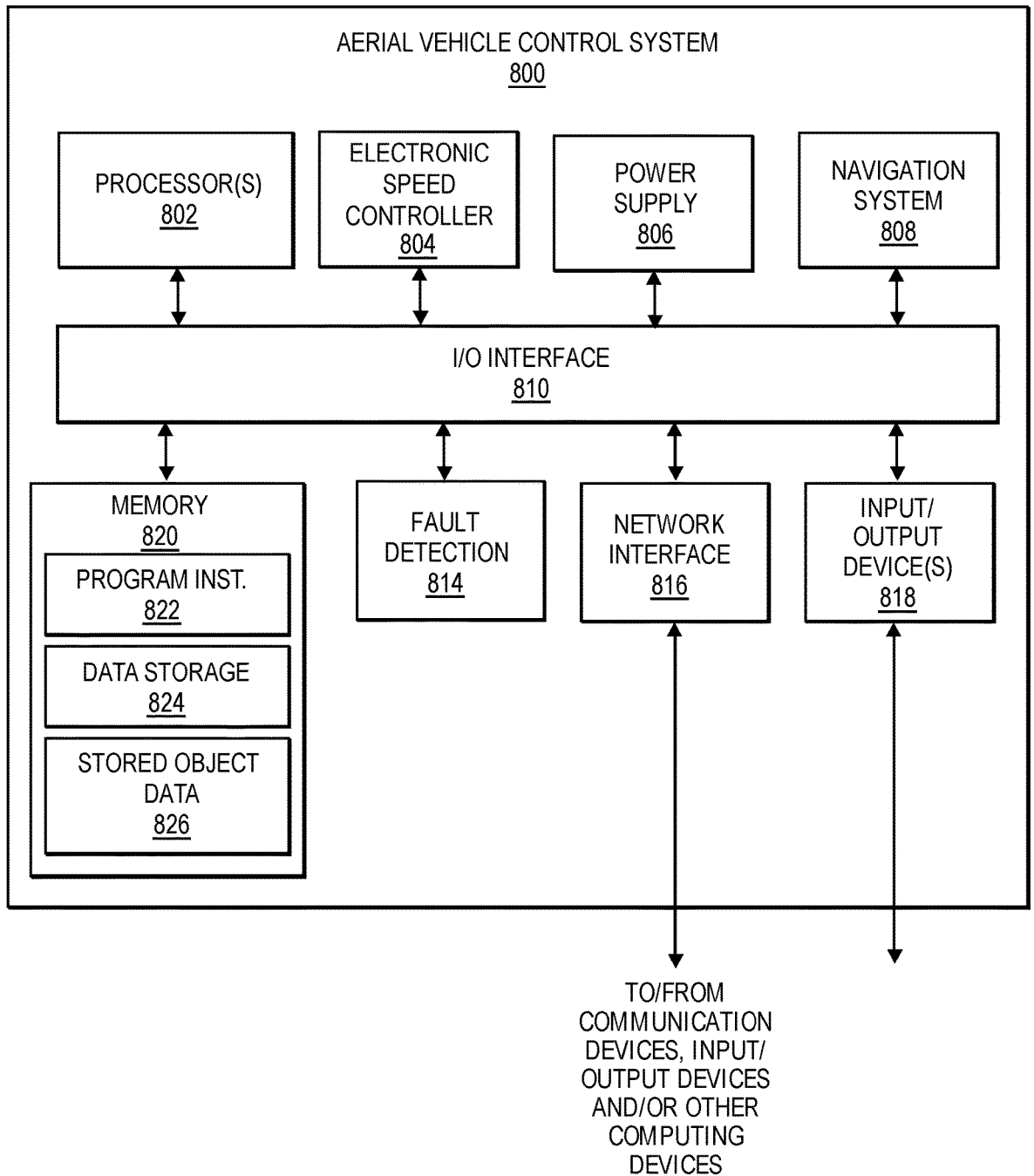
FIG. 8 is a block diagram illustrating various components of an exemplary aerial vehicle control system, according to exemplary embodiments of the present disclosure.

FIG. 8 is a block diagram illustrating various components of an exemplary aerial vehicle control system 800, according to exemplary embodiments of the present disclosure.

In various examples, the block diagram may be illustrative of one or more aspects of the aerial vehicle control system 800 that may be used to implement the various systems and processes discussed above. In the illustrated implementation, the aerial vehicle control system 800 includes one or more processors 802, coupled to a non-transitory computer readable storage medium 820 via an input/output (I/O) interface 810. The aerial vehicle control system 800 may also include one or more electronic speed controllers 804, a power supply or battery 806, navigation system 808, and fault detection systems 814. The aerial vehicle control system 800 may further include network interface 816 and one or more input/output devices 818.

In various implementations, the aerial vehicle control system 800 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, load balancing information, arrangement and/or configuration information relating to the propulsion mechanisms and their associated electronic speed controllers, and/or other data items accessible by the processor(s) 802. In various implementations, the non-transitory computer readable storage medium 820 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 820 as program instructions 822, data storage 824, and stored object data 826, respectively. In other implementations, program instructions and/or stored data may be received, sent or stored upon different types of computer-accessible media, such as non-transitory media, or on similar media separate from the non-transitory computer readable storage medium 820 or the aerial vehicle control system 800.

Generally, a non-transitory, computer readable storage medium may include storage media or memory media such as magnetic or optical media, e.g., disk or CD/DVD-ROM, coupled to the aerial vehicle control system 800 via the I/O interface 810. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface or other peripheral interfaces, such as input/output devices 818. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The electronic speed controller 804, which may be isolated in the event of a fault and/or failure condition by fault detection system 814, communicates with the navigation system 808 and adjusts the operational characteristics of each propulsion mechanism to guide the aerial vehicle along a determined path and/or to perform other navigational maneuvers. The navigation system 808 may include a GPS, IMU, altimeter, speed sensors, or other similar system than can be used to navigate the aerial vehicle to and/or from a location.

The aerial vehicle control system 800 may also include fault detection system 814, that communicates with the processor(s) 802, the non-transitory computer readable storage medium 820, power supply 806, electronic speed controller 804, and/or other components or systems described herein to isolate any electronic speed controllers 804 experiencing a fault and/or failure condition and/or initiate load balancing techniques for two-phase mode operation, as described herein.

The network interface 816 may be configured to allow data to be exchanged between the aerial vehicle control system 800, other devices attached to a network, such as other computer systems, imaging sensors, and/or control systems of other vehicles, systems, machines, equipment, apparatuses, or devices. For example, the network interface 816 may enable wireless communication between numerous aerial vehicles. In various implementations, the network interface 816 may support communication via wireless general data networks, such as a Wi-Fi network. For example, the network interface 816 may support communication via telecommunications networks such as cellular communication networks, satellite networks, and the like.

Input/output devices 818 may, in some implementations, include one or more displays, imaging sensors, image capture devices, thermal sensors, infrared sensors, time of flight sensors, accelerometers, pressure sensors, weather sensors, various other sensors described herein, etc. Multiple input/output devices 818 may be present and controlled by the aerial vehicle control system 800. One or more of these sensors may be utilized to assist in performing the various functions, operations, and processes described herein.

As shown in FIG. 8, the memory may include program instructions 822, which may be configured to implement the example processes and/or sub-processes described above. The data storage 824 may include various data stores for maintaining data items that may be provided for performing the various functions, operations, and processes described herein. For example, the data storage 824 may include stored object data 826, such as trajectory/flight path/planning, wind data, preferred orientation data, failure condition data, DC current information, DC bus voltage information, motor information, flight operation information, flight transition data, vulnerable orientation data, and/or other data items.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in FIGS. 4, 6 and 7, orders in which such methods or processes are presented are not intended to be construed as any limitation on the claimed invention, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A power electronics system, comprising:
a first electronic speed controller (ESC) electrically coupled to a shared direct current (DC) bus via a first pair of protection mechanisms and configured to drive a first phase of a first motor, a first phase of a second motor, and a first phase of a third motor;
a second ESC electrically coupled to the shared DC bus via a second pair of protection mechanisms and configured to drive a second phase of the first motor, a second phase of the second motor, and a second phase of the third motor; and
a third ESC electrically coupled to the shared DC bus via a third pair of protection mechanisms and configured to drive a third phase of the first motor, a third phase of the second motor, and a third phase of the third motor, wherein the power electronics system is configured, to at least:
  detect a first fault in connection with the first ESC;
  trip the first pair of protection mechanisms so as to isolate the first ESC from the shared DC bus and drive:
    the second phase of the first motor, the second phase of the second motor, and the second phase of the third motor using the second ESC; and
    the third phase of the first motor, the third phase of the second motor, and the third phase of the third motor using the third ESC.

2. The power electronics system of claim 1, further comprising:
  a fourth ESC electrically coupled to the shared DC bus via a fourth pair of protection mechanisms and configured to drive a first phase of a fourth motor, a first phase of a fifth motor, and a first phase of a sixth motor;
  a fifth ESC electrically coupled to the shared DC bus via a fifth pair of protection mechanisms and configured to drive a second phase of the fourth motor, a second phase of the fifth motor, and a second phase of the sixth motor; and
  a sixth ESC electrically coupled to the shared DC bus via a sixth pair of protection mechanisms and configured to drive a third phase of the fourth motor, a third phase of the fifth motor, and a third phase of the sixth motor,
  wherein the power electronics system is further configured, to at least:
    detect a second fault in connection with the fourth ESC;
    trip the fourth pair of protection mechanisms so as to isolate the fourth ESC from the shared DC bus and drive:
      the second phase of the fourth motor, the second phase of the fifth motor, and the second phase of the sixth motor using the fifth ESC; and
      the third phase of the fourth motor, the third phase of the fifth motor, and the third phase of the sixth motor using the sixth ESC.

3. The power electronics system of claim 2, wherein the first motor, the fourth motor, the second motor, the fifth motor, the third motor, and the sixth motor are arranged in an alternating configuration.

4. The power electronics system of claim 1, further comprising:
  a fourth ESC electrically coupled to a neutral of the first motor, a neutral of the second motor, and a neutral of the third motor.

5. The power electronics system of claim 1, wherein the first ESC includes a three-phase inverter including a first inverter leg, a second inverter leg, and a third inverter leg, the first inverter leg of the three-phase inverter being electrically coupled to and configured to drive the first phase of the first motor, the second inverter leg being electrically coupled to and configured to drive the first phase of the second motor, and the third inverter leg being electrically coupled to and configured to drive the first phase of the third motor.

6. The power electronics system of claim 5, wherein the three-phase inverter does not include protection devices on each of the first inverter leg, the second inverter leg, and the third inverter leg.

7. An aerial vehicle, comprising:
  a plurality of motors;
  a power electronics system, including:
    a plurality of power electronics units, each of the plurality of power electronics units being electrically coupled to a shared direct current (DC) bus via a respective pair of protection mechanisms and configured to drive a corresponding phase of the plurality of motors,
  wherein the power electronics system is configured to:
    detect a fault associated with a first power electronics unit from the plurality of power electronics units; and
    trip a first respective pair of protection mechanisms associated with the first power electronics unit so as to isolate the first power electronics unit from the shared DC bus so as to initiate two-phase mode operation of at least some of the plurality of motors.

8. The aerial vehicle of claim 7, wherein the plurality of power electronic units includes:
  the first power electronics unit coupled to the shared DC bus via the first respective pair of protection mechanisms and configured to drive a first phase of at least some of the plurality of motors;
  a second power electronics unit coupled to the shared DC bus via a second respective pair of protection mechanisms and configured to drive a second phase of at least some of the plurality of motors; and
  a third power electronics unit coupled to the shared DC bus via a third respective pair of protection mechanisms and configured to drive a third phase of at least some of the plurality of motors.

9. The aerial vehicle of claim 8, wherein the first power electronics unit includes a set of inverters, each inverter of the set of inverters configured to drive the first phase of at least some of the plurality of motors.

10. The aerial vehicle of claim 8, wherein the first power electronics unit includes a three-phase inverter including a first inverter leg, a second inverter leg, and a third inverter leg, the first inverter leg of the three-phase inverter being electrically coupled to and configured to drive a first phase of a first motor of the plurality of motors, the second inverter leg being electrically coupled to and configured to drive a first phase of a second motor of the plurality of motors, and the third inverter leg being electrically coupled to and configured to drive a first phase of a third motor of the plurality of motors.

11. The aerial vehicle of claim 10, wherein the three-phase inverter does not include protection devices on each of the first inverter leg, the second inverter leg, and the third inverter leg.

12. The aerial vehicle of claim 7, wherein the plurality of motors are arranged such that during two-phase mode operation of at least some of the plurality of motors, motors operating in two-phase mode alternate with motors operating in three-phase mode.

13. The aerial vehicle of claim 12, wherein the aerial vehicle is trimmed to compensate for the two-phase mode operation of at least some of the plurality of motors.

14. The aerial vehicle of claim 7, wherein the aerial vehicle is configured to:
  determine at least a first two-phase operating mode configuration and a second two-phase operating mode configuration; and
  alternate, during two-phase mode operation of at least some of the plurality of motors, between the first two-phase operating mode configuration and the second two-phase mode operating configuration so as to load balance operation of the plurality of motors.

15. The aerial vehicle of claim 7, wherein each respective pair of protection mechanisms includes a first bidirectional solid state circuit breaker electrically coupling a respective power electronics unit from the plurality of power electronics units to a positive rail of the shared DC bus and a second solid state circuit breaker electrically coupling the respective power electronics unit to a negative rail of the shared DC bus.

16. A method for driving a plurality of motors, the method comprising:
   driving, using a first motor drive unit, a first phase of a first motor, a first phase of a second motor, and a first phase of a third motor;
   driving, using a second motor drive unit, a second phase of the first motor, a second phase of the second motor, and a second phase of the third motor; and
   driving, using a third motor drive unit, a third phase of the first motor, a third phase of the second motor, and the third phase of the third motor.

17. The method of claim 16, further comprising:
   detecting a fault condition associated with the first motor drive unit; and
   isolating the first motor drive unit so as to initiate two-phase operation of the first motor, the second motor, and the third motor,
   wherein:
      the second phase of the first motor, the second phase of the second motor, and the second phase of the third motor are driven by the second motor drive unit; and
      the third phase of the first motor, the third phase of the second motor, and the third phase of the third motor are driven by the third motor drive unit.

18. The method of claim 17, further comprising:
   determining at least a first two-phase operating mode configuration and a second two-phase operating mode configuration; and
   alternating, during two-phase mode operation of the first motor, the second motor, and the third motor, between the first two-phase operating mode configuration and the second two-phase mode operating configuration so as to load balance operation of the first motor, the second motor, and the third motor.

19. The method of claim 18, wherein the three-phase inverter does not include protection devices on each of the first inverter leg, the second inverter leg, and the third inverter leg.

20. The method of claim 16, wherein the first motor drive unit includes a three-phase inverter including a first inverter leg, a second inverter leg, and a third inverter leg, the first inverter leg of the three-phase inverter being electrically coupled to and configured to drive the first phase of the first motor, the second inverter leg being electrically coupled to and configured to drive the first phase of the second motor, and the third inverter leg being electrically coupled to and configured to drive the first phase of the third motor.

* * * * *